US010368658B2

(12) United States Patent
Artwohl et al.

(10) Patent No.: US 10,368,658 B2
(45) Date of Patent: *Aug. 6, 2019

(54) DISPLAY CASE DOOR ASSEMBLY WITH VACUUM PANEL

(71) Applicant: ANTHONY, INC., Sylmar, CA (US)

(72) Inventors: Paul J. Artwohl, Stevensville, MI (US); Jeffery W. Nicholson, Palmdale, CA (US); Matthew Rolek, Sylmar, CA (US)

(73) Assignee: Anthony, Inc., Sylmar, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 15/429,366

(22) Filed: Feb. 10, 2017

(65) Prior Publication Data
US 2017/0150828 A1    Jun. 1, 2017

Related U.S. Application Data

(63) Continuation of application No. 14/563,760, filed on Dec. 8, 2014.
(Continued)

(51) Int. Cl.
A47F 3/04         (2006.01)
E06B 3/66         (2006.01)
(Continued)

(52) U.S. Cl.
CPC ............ A47F 3/0434 (2013.01); A47F 3/002 (2013.01); A47F 3/005 (2013.01); A47F 3/043 (2013.01);
(Continued)

(58) Field of Classification Search
CPC .... E06B 3/6612; E06B 3/66366; E06B 3/025; E06B 3/6715; E06B 3/663; Y02B 80/24;
(Continued)

(56) References Cited

U.S. PATENT DOCUMENTS 2,959,493 A    11/1960 Vincent
3,441,924 A     4/1969 Peek et al.
(Continued)

FOREIGN PATENT DOCUMENTS

FR          2777762        10/1999
WO       WO 96/12862        5/1996
WO      WO 2008/029801      3/2008

OTHER PUBLICATIONS

International Search Report and Written Opinion in International Application No. PCT/US2017/020223, dated May 22, 2017 12 pages.
(Continued)

Primary Examiner — Donald J Loney
(74) Attorney, Agent, or Firm — Fish & Richardson P.C.

(57) ABSTRACT

A display case door assembly for a temperature-controlled storage device includes a frame defining an opening into the temperature-controlled storage device and a transparent unit coupled to the frame. The transparent unit includes a first vacuum pane, a second vacuum pane, and an evacuated gap between the first and second vacuum panes. The evacuated gap has a predetermined thickness within which a vacuum is drawn, thereby providing a thermal insulation effect for the transparent unit. The transparent unit further includes a plurality of spacers disposed within the evacuated gap and configured to maintain the predetermined thickness of the evacuated gap when the vacuum is drawn therein.

21 Claims, 21 Drawing Sheets

Related U.S. Application Data

(60) Provisional application No. 61/938,555, filed on Feb. 11, 2014.

(51) Int. Cl.

| | | |
|---|---|---|
| *E06B 3/663* | (2006.01) | |
| *E05F 1/06* | (2006.01) | |
| *A47F 3/00* | (2006.01) | |
| *E04B 1/80* | (2006.01) | |
| *E06B 3/02* | (2006.01) | |
| *E06B 3/67* | (2006.01) | |
| *E05F 1/02* | (2006.01) | |

(52) U.S. Cl.
CPC .............. *E04B 1/803* (2013.01); *E05F 1/061* (2013.01); *E06B 3/025* (2013.01); *E06B 3/6612* (2013.01); *E06B 3/6617* (2013.01); *E06B 3/66304* (2013.01); *E05F 1/02* (2013.01); *E05Y 2900/31* (2013.01); *E06B 3/663* (2013.01); *E06B 3/66366* (2013.01); *E06B 3/6715* (2013.01); *Y02A 30/25* (2018.01); *Y02B 80/24* (2013.01); *Y10T 428/231* (2015.01)

(58) Field of Classification Search
CPC .. B32B 17/10055; A47F 3/0434; A47F 3/005; A47F 3/002; A47F 3/043; E05Y 2900/31
See application file for complete search history.

(56) References Cited

U.S. PATENT DOCUMENTS

| | | | |
|---|---|---|---|
| 3,733,650 | A | 5/1973 | Douglas |
| 3,911,245 | A | 10/1975 | O'Shaughnessy |
| 4,631,777 | A | 12/1986 | Takimoto |
| 4,637,167 | A | 1/1987 | Svensson |
| 4,671,582 | A | 6/1987 | Stromquist et al. |
| 4,683,154 | A | 7/1987 | Benson et al. |
| 4,786,344 | A | 11/1988 | Beuther |
| 4,928,448 | A | 5/1990 | Phillip |
| 4,991,259 | A | 2/1991 | Finkelstein et al. |
| 5,027,574 | A | 7/1991 | Phillip |
| 5,097,642 | A | 3/1992 | Richardson |
| 5,124,185 | A | 6/1992 | Kerr et al. |
| 5,154,953 | A | 10/1992 | de Moncuit |
| 5,255,473 | A | 10/1993 | Kaspar |
| 5,270,084 | A | 12/1993 | Parker |
| 5,643,644 | A | 7/1997 | Demars |
| 5,657,607 | A | 8/1997 | Collins et al. |
| 5,664,395 | A | 9/1997 | Collins et al. |
| 5,891,536 | A | 4/1999 | Collins et al. |
| 5,902,652 | A | 5/1999 | Collins et al. |
| 5,989,659 | A | 11/1999 | Kato et al. |
| 6,052,965 | A | 4/2000 | Florentin |
| 6,071,575 | A | 6/2000 | Collins et al. |
| 6,103,324 | A | 8/2000 | Collins et al. |
| 6,105,336 | A | 8/2000 | Katoh et al. |
| 6,210,763 | B1 | 4/2001 | Katoh et al. |
| 6,261,652 | B1 | 7/2001 | Poix et al. |
| 6,291,036 | B1 | 9/2001 | Wang et al. |
| 6,326,067 | B1 | 12/2001 | Veerasamy |
| 6,336,984 | B1 | 1/2002 | Aggas |
| 6,352,749 | B1 | 3/2002 | Aggas |
| 6,365,242 | B1 | 4/2002 | Veerasamy |
| 6,372,312 | B1 | 4/2002 | Aggas |
| 6,383,580 | B1 | 5/2002 | Aggas |
| 6,387,460 | B1 | 5/2002 | Shukuri et al. |
| 6,399,169 | B1 | 6/2002 | Wang et al. |
| 6,420,002 | B1 | 7/2002 | Aggas et al. |
| 6,435,630 | B1 | 8/2002 | Anin et al. |
| 6,436,492 | B1 | 8/2002 | Landa et al. |
| 6,436,493 | B1 | 8/2002 | Asano et al. |
| 6,444,281 | B1 | 9/2002 | Wang et al. |
| 6,472,032 | B1 | 10/2002 | Asano |
| 6,478,911 | B1 | 11/2002 | Wang et al. |
| 6,479,112 | B1 | 11/2002 | Shukuri et al. |
| 6,497,931 | B1 | 12/2002 | Aggas |
| 6,503,583 | B2 | 1/2003 | Nalepka et al. |
| 6,506,272 | B1 | 1/2003 | Aggas |
| 6,541,083 | B1 | 4/2003 | Landa et al. |
| 6,541,084 | B1 | 4/2003 | Wang |
| 6,558,494 | B1 | 5/2003 | Wang et al. |
| 6,606,832 | B2 | 8/2003 | Richardson et al. |
| 6,606,833 | B2 | 8/2003 | Richardson et al. |
| 6,635,321 | B2 | 10/2003 | Wang et al. |
| 6,641,689 | B1 | 11/2003 | Aggas |
| 6,663,923 | B2 | 12/2003 | Futagami et al. |
| 6,689,241 | B1 | 2/2004 | Delhorme et al. |
| 6,692,600 | B2 | 2/2004 | Veerasamy et al. |
| 6,701,575 | B2 | 3/2004 | Padiak et al. |
| 6,701,749 | B2 | 3/2004 | Wang et al. |
| 6,946,171 | B1 | 9/2005 | Aggas |
| 6,955,026 | B2 | 10/2005 | Misonou |
| 7,081,178 | B2 | 7/2006 | Collins |
| 7,114,306 | B2 | 10/2006 | Minaai et al. |
| 7,141,130 | B2 | 11/2006 | Minaai et al. |
| 7,244,480 | B2 | 7/2007 | Minaai et al. |
| 7,449,227 | B2 | 11/2008 | Echigoya et al. |
| 7,553,527 | B2 | 6/2009 | Minaai |
| 7,722,956 | B2 | 5/2010 | Collins |
| 7,833,592 | B2 | 11/2010 | Pilloy |
| 7,845,142 | B2 | 12/2010 | Theios |
| 7,851,034 | B2 | 12/2010 | Cooper |
| 7,919,157 | B2 | 4/2011 | Cooper |
| 7,929,194 | B2 | 4/2011 | Legois |
| 8,137,494 | B2 | 3/2012 | Cooper et al. |
| 8,182,887 | B2 | 5/2012 | Jones |
| 8,202,587 | B2 | 6/2012 | Wang |
| 8,227,055 | B2 | 7/2012 | Wang |
| 8,377,524 | B2 | 2/2013 | Theios et al. |
| 8,377,525 | B2 | 2/2013 | Cooper et al. |
| 8,434,904 | B2 | 5/2013 | Alvarez |
| 8,460,493 | B2 | 6/2013 | Cooper |
| 8,492,788 | B2 | 7/2013 | Veerasamy et al. |
| 8,500,933 | B2 | 8/2013 | Cooper |
| 8,506,738 | B2 | 8/2013 | Wang et al. |
| 8,512,829 | B2 | 8/2013 | Cooper |
| 8,512,830 | B2 | 8/2013 | Bettger et al. |
| 8,590,343 | B2 | 11/2013 | Wang |
| 8,613,161 | B2 | 12/2013 | Nicholson et al. |
| 8,679,271 | B2 | 3/2014 | Veerasamy |
| 8,679,598 | B2 | 3/2014 | Veerasamy |
| 8,679,599 | B2 | 3/2014 | Grzybowski et al. |
| 8,733,128 | B2 | 5/2014 | Dennis |
| 8,742,287 | B2 | 6/2014 | Dear |
| 8,763,427 | B2 | 7/2014 | Wang |
| 8,794,033 | B2 | 8/2014 | Dear |
| 8,821,999 | B2 | 9/2014 | Grzybowski et al. |
| 8,833,105 | B2 | 9/2014 | Dennis et al. |
| 8,840,007 | B2 | 9/2014 | Li |
| 8,899,471 | B2 | 12/2014 | Li et al. |
| 8,899,472 | B2 | 12/2014 | Li et al. |
| 8,900,679 | B2 | 12/2014 | Theios et al. |
| 8,950,162 | B2 | 2/2015 | Miller et al. |
| 8,955,358 | B2 | 2/2015 | Grzybowski et al. |
| 8,984,909 | B2 | 3/2015 | Li et al. |
| 9,010,149 | B2 | 4/2015 | Jeon et al. |
| 9,169,155 | B2 | 10/2015 | Dennis et al. |
| 9,187,947 | B2 | 11/2015 | Raggio |
| 9,221,707 | B2 | 12/2015 | Wang et al. |
| 9,498,072 | B2 | 11/2016 | Artwohl |
| 2002/0035852 | A1 | 3/2002 | Wang |
| 2003/0066256 | A1 | 4/2003 | DeBlock |
| 2003/0124296 | A1 | 7/2003 | Smith |
| 2007/0180842 | A1 | 8/2007 | LaRose, Jr. |
| 2009/0139165 | A1 | 6/2009 | Prete |
| 2010/0043293 | A1* | 2/2010 | Nicholson .............. A47F 3/0434 49/70 |
| 2011/0089802 | A1 | 4/2011 | Cording |
| 2013/0142972 | A1 | 6/2013 | Raggio |
| 2013/0202821 | A1 | 8/2013 | Son et al. |
| 2013/0255317 | A1 | 10/2013 | Cooper |
| 2013/0291594 | A1 | 11/2013 | Cooper |

(56) References Cited

U.S. PATENT DOCUMENTS

| | | |
|---|---|---|
| 2013/0316099 A1 | 11/2013 | Miller et al. |
| 2013/0323441 A1 | 12/2013 | Dennis et al. |
| 2014/0162000 A1 | 6/2014 | Son et al. |
| 2014/0182774 A1 | 7/2014 | Grzybowski et al. |
| 2014/0186557 A1 | 7/2014 | Grzybowski et al. |
| 2014/0212605 A1 | 7/2014 | Son et al. |
| 2014/0335291 A1 | 11/2014 | Hasegawa et al. |
| 2014/0356558 A1 | 12/2014 | Hasegawa et al. |
| 2015/0079313 A1 | 3/2015 | Vogel-Martin et al. |
| 2015/0184446 A1 | 7/2015 | Veerasamy et al. |
| 2015/0218032 A1 | 8/2015 | Hogan et al. |
| 2015/0218042 A1 | 8/2015 | Hogan et al. |
| 2015/0223619 A1 | 8/2015 | Artwohl et al. |
| 2015/0233174 A1 | 8/2015 | Stark |
| 2015/0337591 A1 | 11/2015 | Koga et al. |
| 2016/0166085 A1 | 6/2016 | Twohy |
| 2017/0245660 A1 | 8/2017 | Artwohl et al. |

OTHER PUBLICATIONS

Extended European Search Report for Application No. 15151666.3, dated Jul. 2, 2015, 8 pages.
EP Office Action issued in European Application No. 15151666.3, dated Dec. 4, 2018, 4 pages.

\* cited by examiner

DISPLAY CASE DOOR ASSEMBLY WITH VACUUM PANEL

CROSS-REFERENCE TO RELATED PATENT APPLICATIONS

This application is a continuation of U.S. patent application Ser. No. 14/563,760 filed Dec. 8, 2014, which claims the benefit of and priority to U.S. Provisional Patent Application No. 61/938,555 filed Feb. 11, 2014, the entireties of which are incorporated herein by reference.

BACKGROUND

Temperature-controlled storage devices (e.g., a refrigerator, freezer, refrigerated merchandiser, display case, etc.) are used in a wide variety of commercial, institutional, and residential applications for storing and/or displaying refrigerated or frozen objects. Many temperature-controlled storage devices have a display case door (e.g., a door with an insulated glass panel) through which objects within the temperature-controlled storage device can be viewed.

Conventional insulated glass panels typically include multiple parallel panes with a layer of gas between the panes. The gas is generally air or a noble gas (e.g., Argon, Krypton, etc.) which functions as a thermal insulator to reduce heat transfer through the panel. In conventional insulated glass panels, the pressure of the air or gas between the panes is equal or substantially equal to atmospheric pressure. Reducing the pressure of the air or gas between the panes would cause atmospheric pressure to apply a large force (e.g., thousands of pounds of force) to the surface of the panel. Such a force is likely to bend or break an insulated glass panel, especially if the panel is relatively thin.

Conventional insulated glass panels typically use panes of tempered glass in order to reduce the risk of injury in the event that the panes are broken. Tempered glass has a high residual stress which adds to any atmospheric pressure applied to the surface of the panel. Additionally, the high residual stress of tempered glass can cause tempered glass panels to have an uneven (e.g., non-flat) surface. For these reasons, an evacuated space between panes (e.g., a vacuum, a reduced pressure space, etc.) has not been successfully implemented in an insulated glass panel for use with a temperature-controlled storage device.

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

SUMMARY

One implementation of the present disclosure is a display case door assembly for a temperature-controlled storage device. The display case door assembly includes a frame defining an opening into the temperature-controlled storage device and a transparent unit coupled to the frame. The transparent unit includes a first vacuum pane, a second vacuum pane, and an evacuated gap between the first and second vacuum panes. The evacuated gap has a predetermined thickness within which a vacuum is drawn, thereby providing a thermal insulation effect for the transparent unit. The transparent unit further includes a plurality of spacers disposed within the evacuated gap and configured to maintain the predetermined thickness of the evacuated gap when the vacuum is drawn therein.

In some embodiments, the transparent unit includes a perimeter seal bonding a perimeter of the first vacuum pane to a perimeter of the second vacuum pane and providing an airtight seal within the evacuated gap. In some embodiments, the predetermined thickness of the evacuated gap is less than one millimeter. In some embodiments, the predetermined thickness of the evacuated gap is approximately 0.2 millimeters. In some embodiments, the plurality of spacers are arranged in a grid and separated from each other by a distance approximately ten times the predetermined thickness of the evacuated gap.

In some embodiments, at least one of the first vacuum pane and the second vacuum pane is made of non-tempered glass having an increased flatness relative to tempered glass. In some embodiments, at least one of the first vacuum pane and the second vacuum pane is made of a substantially transparent material having an increased flatness relative to tempered glass. In some embodiments, at least one of the first vacuum pane and the second vacuum pane is made of a low emissivity material configured to reduce radiation heat transfer through the transparent unit.

In some embodiments, the display case door assembly further includes a protective layer laminated to an outside surface of the transparent unit and configured to prevent the transparent unit from breaking into a plurality of uncontained shards. In some embodiments, the display case door assembly further includes a film or coating laminated to a surface of the transparent unit. The film or coating may include at least one of an anti-condensate layer, an ultraviolet inhibiting layer, and a low emissivity layer.

In some embodiments, the display case door assembly further includes a rail hingedly connected to the frame and defining a channel within which an edge of the transparent unit is contained. The rail and the transparent unit may be configured to rotate as a unit relative to the frame between an open position and a closed position. In some embodiments, the transparent unit is coupled to the frame via at least one of a hinged connection and a sliding connection. The transparent unit may be configured to move relative to the frame between an open position and a closed position.

Another implementation of the present disclosure is a vacuum panel for a temperature-controlled storage device. The vacuum panel includes a first vacuum pane, a second vacuum pane, and an evacuated gap between the first and second vacuum panes. The evacuated gap has a predetermined thickness within which a vacuum is drawn, thereby providing a thermal insulation effect for the vacuum panel. The vacuum panel further includes a plurality of spacers disposed within the evacuated gap and configured to maintain the predetermined thickness of the evacuated gap when the vacuum is drawn therein.

In some embodiments, the predetermined thickness of the evacuated gap is less than 0.5 millimeters. In some embodiments, the plurality of spacers are arranged in a grid and separated from each other by a distance approximately ten times the predetermined thickness of the evacuated gap.

In some embodiments, at least one of the first vacuum pane and the second vacuum pane is made of non-tempered glass having an increased flatness relative to tempered glass. In some embodiments, at least one of the first vacuum pane and the second vacuum pane is made of a low emissivity material configured to reduce radiation heat transfer through the vacuum panel.

In some embodiments, the vacuum panel further includes a protective layer laminated to an outside surface of the vacuum panel and configured to prevent the vacuum panel from breaking into a plurality of uncontained shards. In some embodiments, the vacuum panel further includes a film or coating laminated to a surface of the vacuum panel. The film or coating may include at least one of an anti-condensate layer, an ultraviolet inhibiting layer, and a low emissivity layer.

Another implementation of the present disclosure is a thermally-insulated transparent. The thermally-insulated transparent unit includes a first vacuum pane, a second vacuum pane, and an evacuated gap between the first and second vacuum panes. The evacuated gap has a predetermined thickness within which a vacuum is drawn, thereby providing a thermal insulation effect for the transparent unit. The transparent unit further includes a plurality of spacers disposed within the evacuated gap and configured to maintain the predetermined thickness of the evacuated gap when the vacuum is drawn therein. In some embodiments, at least one of the first vacuum pane and the second vacuum pane is made of non-tempered glass having an increased flatness relative to tempered glass

DETAILED DESCRIPTION

Figure 1:
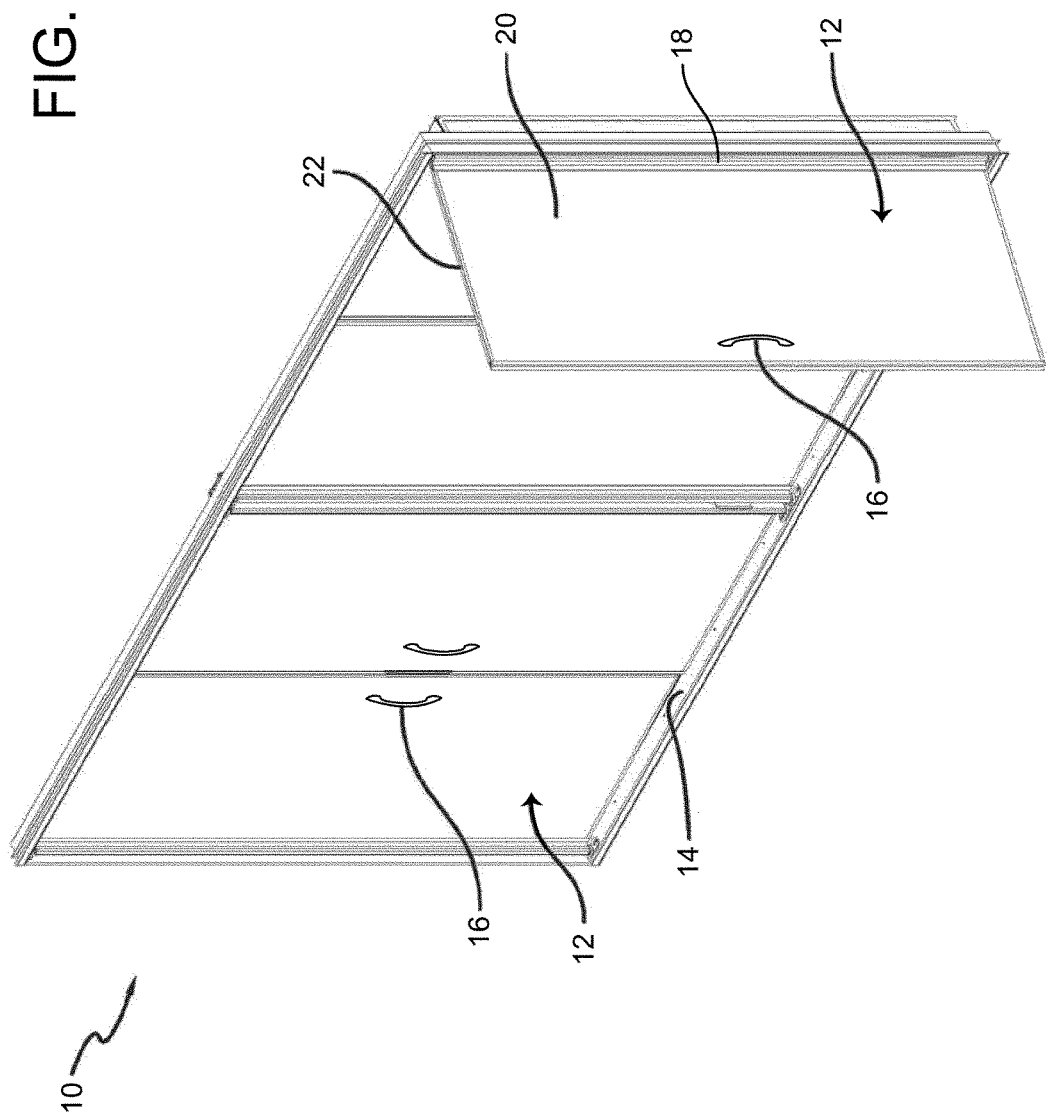
FIG. 1 is a perspective view of a display case door assembly including a door frame and four display case doors coupled to the door frame via a rail assembly, each door having a transparent glass unit, according to an exemplary embodiment.
Figure 2:
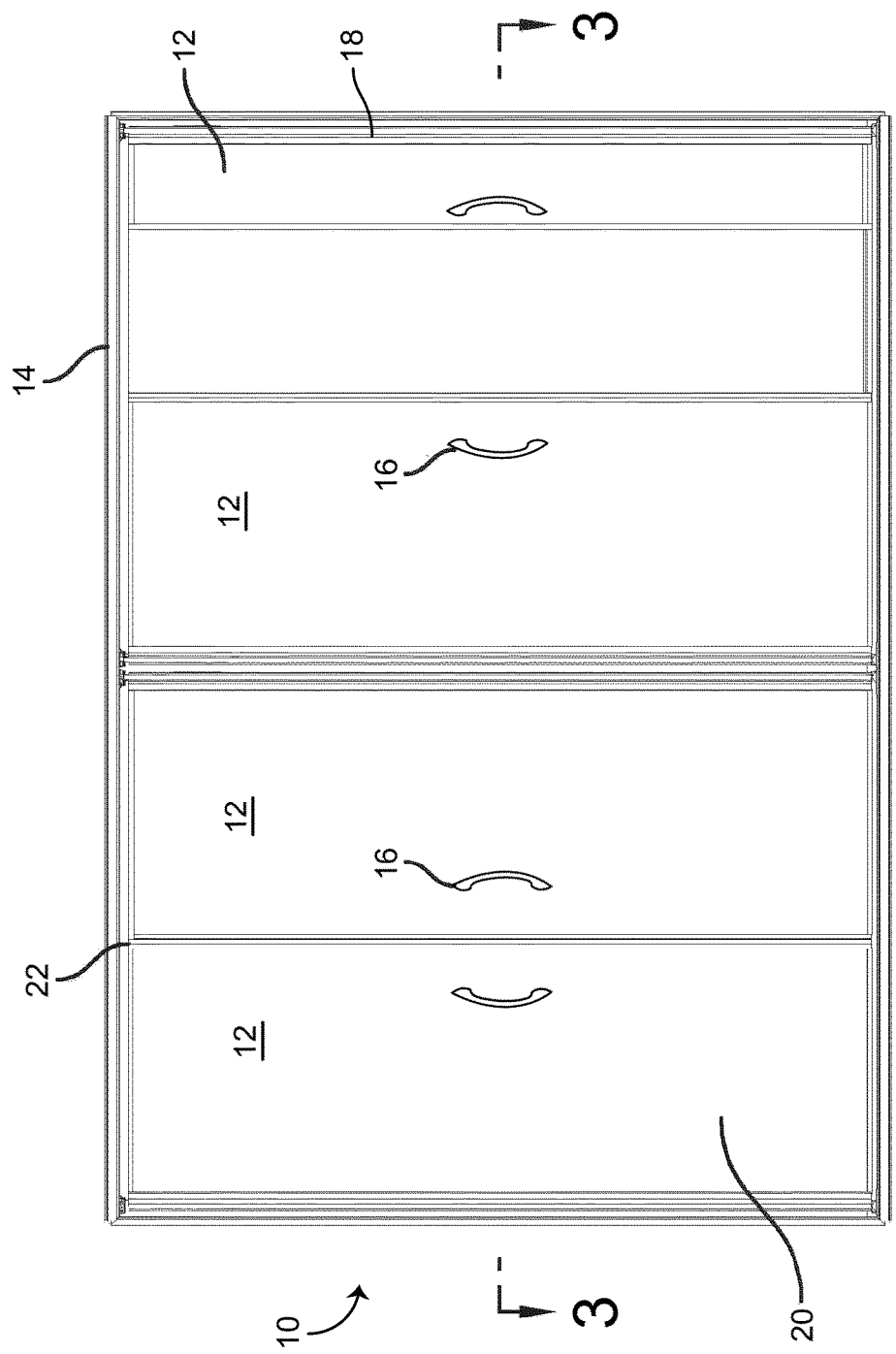
FIG. 2 is a front elevation view of the display case door assembly of FIG. 1, according to an exemplary embodiment.
Figure 3:
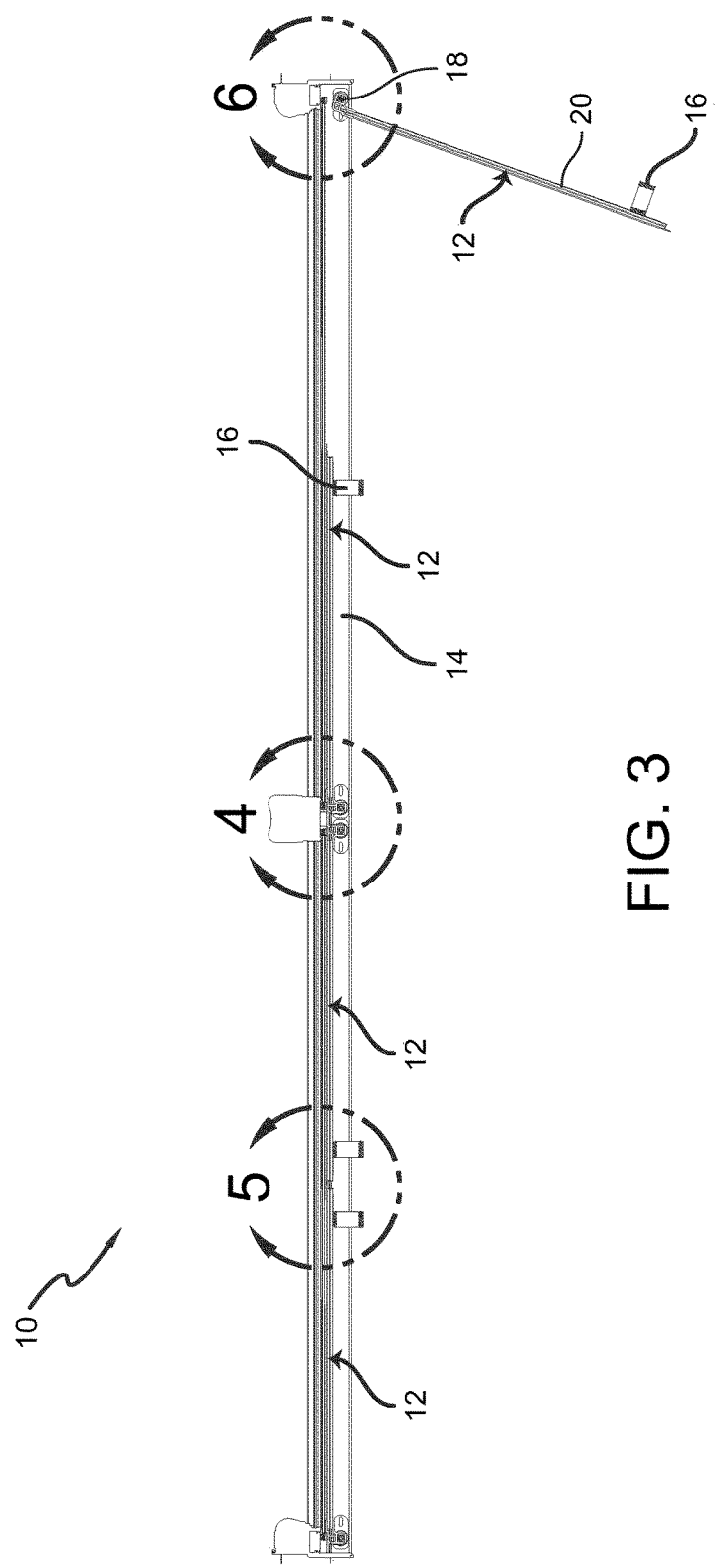
FIG. 3 is a cross-sectional plan view of the display case door assembly of FIG. 1 taken along line 3-3 of FIG. 2, according to an exemplary embodiment.
Figure 4:
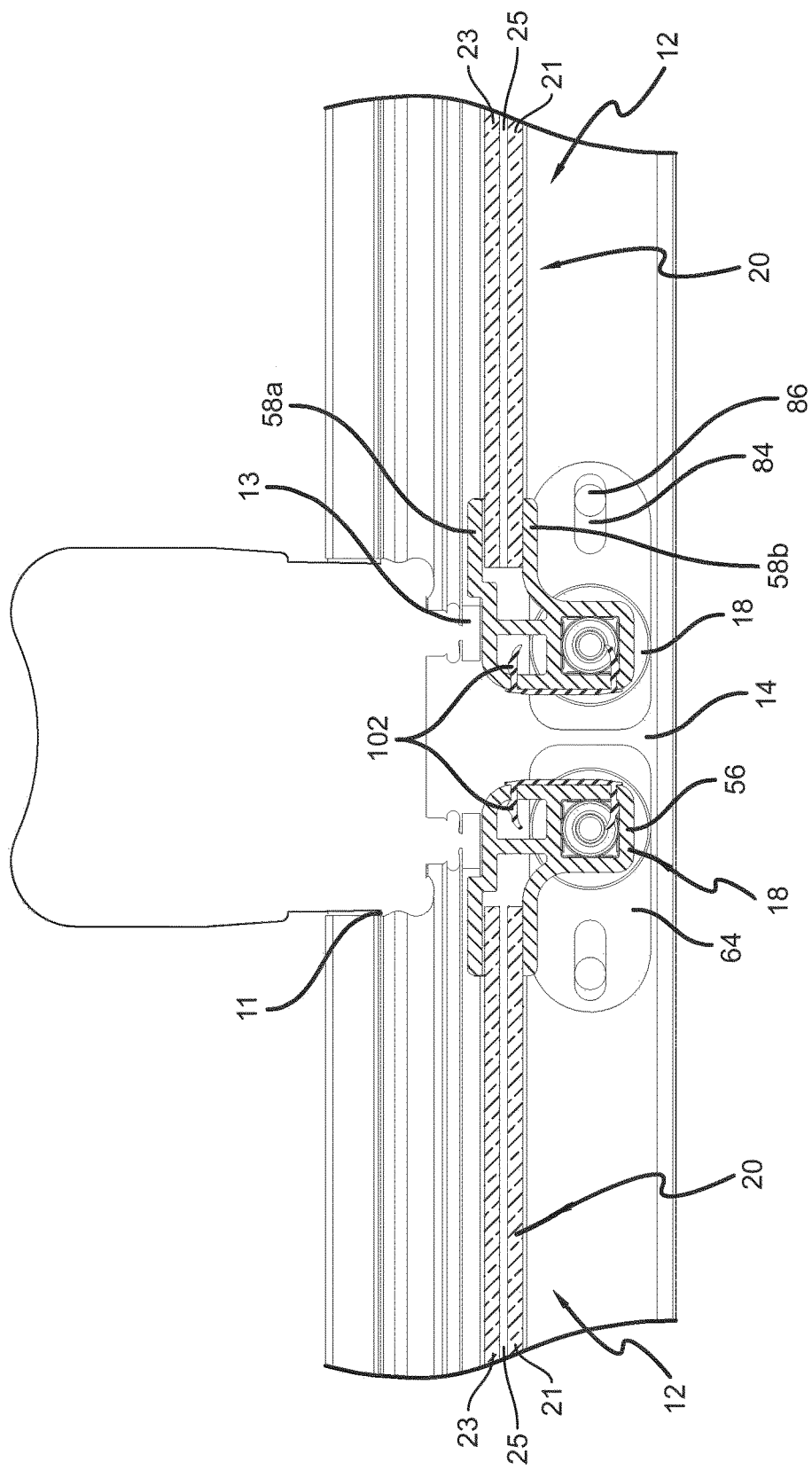
FIG. 4 is a detail taken from FIG. 2 as indicated, according to an exemplary embodiment.

Referring generally to the FIGURES, a display case door assembly with a vacuum panel is shown, according to an exemplary embodiment. The display case door assembly described herein may be used as a door assembly for a refrigerator, freezer, refrigerated merchandiser, or other display case in a wide variety of commercial, institutional, and residential applications. For example, the display case door assembly may be used as part of a temperature-controlled storage device in a supermarket or other similar facility and may include one or more transparent panels or panes (e.g., insulated glass panels) through which objects within the temperature-controlled storage device can be viewed.

The display case door assembly described herein includes a vacuum panel. The vacuum panel includes two parallel panes separated by a small gap (e.g., less than 1 mm, as small as 0.2 mm, etc.). In some embodiments, the gap between the panes is approximately 0.2 mm. The gap is evacuated to produce a vacuum between the panes. Advantageously, the vacuum provides a high thermal insulation effect in a relatively small space. In some embodiments, one or more of the panes is made of low emissivity glass to reduce radiation heat transfer through the vacuum panel.

In some embodiments, one or more of the panes is made of non-tempered glass. Non-tempered glass does not have the residual stresses of tempered glass and provides an improved flatness relative to tempered glass. Advantageously, non-tempered glass allows the panes to be separated by a small gap (e.g., as small as 0.2 mm) and minimizes the thickness of the panel.

The vacuum panel may include spacers in the evacuated gap to maintain the separation between panes when the gap is evacuated. The spacers prevent external pressure (e.g., atmospheric pressure) from causing the panes to flex inward when a vacuum is drawn between the panes. In some embodiments, the spacers include a plurality of support pillars between the parallel panes. The support pillars may be arranged in a grid (e.g., approximately 20 mm apart) and configured to provide internal support for the vacuum panel to counter the pressure differential caused by the evacuated gap.

In some embodiments, one or more of the panes is laminated. For example, the outer pane of the vacuum panel may be laminated with a film, coating, or another panel (e.g., a panel of tempered glass) to protect against injury in the event that the outer pane is damaged or broken. An anti-condensate film or coating may be applied to an inner pane of the vacuum panel and may be used to prevent condensation from occurring.

Advantageously, the present invention provides a thermopane unit that appears as a single pane of glass due to the minimal separation between panes. The separation between panes of glass is minimized by providing an evacuated layer (e.g., a vacuum layer) which creates a thermobreak having a high thermal resistance. The thickness of the evacuated layer can be precisely controlled by using non-tempered glass and providing spacers to maintain the separation between panes. A coating or laminate layer can be used to keep the unit intact if breakage occurs. In a preferred embodiment, coating or layer can also function as an anti-condensate coating and/or UV inhibitor.

Before discussing further details of the display case door and/or the components thereof, it should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

Referring now to FIGS. 1-6, a display case door assembly 10 is shown, according to an exemplary embodiment. Display case door assembly 10 may be used in conjunction with a temperature-controlled storage device (e.g., a refrigerator, a freezer, a warmer, a heater, etc.) for storing and/or displaying refrigerated or frozen goods. For example, display case door assembly 10 may be implemented as part of a refrigerated display case in a supermarket, warehouse store, or other similar facility.

Display case door assembly 10 is shown to include a plurality of display case doors 12 mounted in a door frame 14. Each display case door 12 includes a transparent unit 20. In some embodiments, transparent unit 20 is hingedly connected to frame 14 via a rail 18. In various other embodiments, transparent unit 20 may be implemented as part of a sliding door or window, a rotary door, a swing sliding door, a fixed-position window or panel, or otherwise positioned within a frame or opening. Transparent unit 20 may be configured to move relative to the frame or opening (e.g., rotating via hinges as shown in FIG. 1, sliding along a track, etc.) or may be fixed within the frame or opening. In various implementations, transparent unit 20 may be used as part of a door assembly configured to provide a thermal insulation effect (e.g., for a refrigerated display case) or otherwise used as any type of transparent or substantially transparent panel that provides a thermal insulation effect (e.g., a sliding or hinged window, a fixed-position window, a revolving or sliding door, a hinged door, etc.).

In some embodiments, transparent unit 20 includes one or more panes of transparent or substantially transparent glass (e.g., insulated glass, non-tempered glass, tempered glass, etc.), plastics, or other transparent or substantially transparent materials. In some embodiments, transparent unit 20 includes multiple layers of transparent panes (i.e., multiple panes per door 12). For example, transparent unit 20 may be a multi-pane unit having a first vacuum pane 21 and a second vacuum pane 23. Vacuum panes 21 and 23 may be separated by a small gap 25 which can be evacuated to draw a vacuum between panes 21 and 23.

Figure 5:
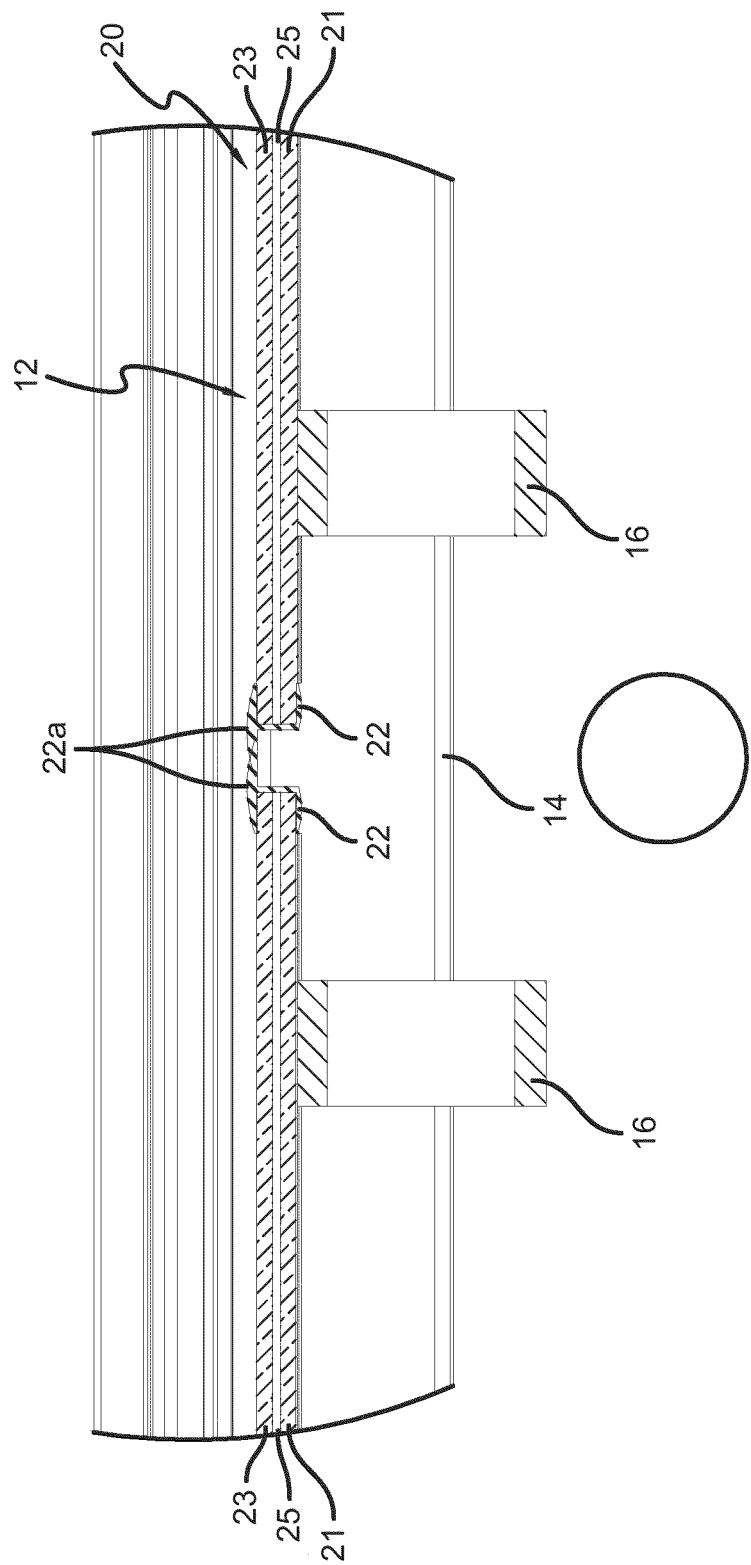
FIG. 5 is a detail taken from FIG. 2 as indicated, according to an exemplary embodiment.
Figure 6:
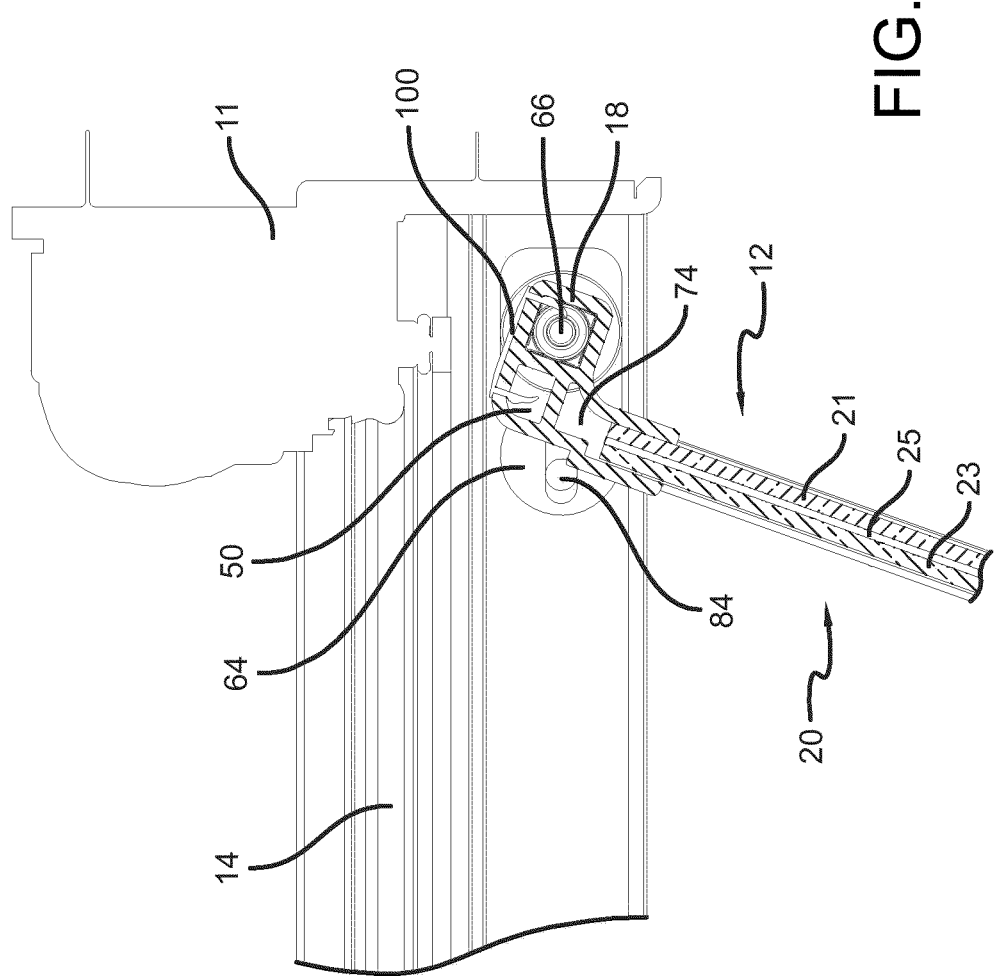
FIG. 6 is a detail taken from FIG. 2 as indicated, according to an exemplary embodiment.

Display case door 12 is shown to include edge guards 22. In some embodiments, edge guards 22 are transparent moldings. Edge guards 22 may be adhered to the top edge, bottom edge, and non-hinge side edge of transparent unit 20. Silicon or the like may be used for bonding edge guards 22 to the edges of transparent unit 20. Edge guards 22 provide a sealing feature for display case door 12. For example, as shown in FIG. 5, the edge guard 22 on the non-hinged edge of transparent unit 20 (i.e., the edge opposite the hinged edge) may include a wiper 22a that cooperates with a wiper 22a on another door 12 to seal the display case when doors 12 are closed. In some embodiments, edge guards 22 can be omitted.

In some embodiments, display case door 12 includes a handle 16. Handle 16 may be used to open, close, lock, unlock, seal, unseal, or otherwise operate display case door 12. Handle 16 may be made from extruded aluminum tubes that are cut to a specified dimension and bonded to a front surface of display case door 12. However, this is not a limitation on the present invention and other handle configurations can be used.

Display case door 12 may include any of a variety of structures or features for attaching display case door 12 to frame 14. For example, display case door 12 may include a structure for housing wiring, a mullion 11, one or more gaskets 13, and/or other associated brackets and components typically included in refrigerated display cases. Detailed descriptions of such components are provided in U.S. Pat. Nos. 6,606,832, and 6,606,833, which are incorporated by reference herein in their entireties.

Figure 7:
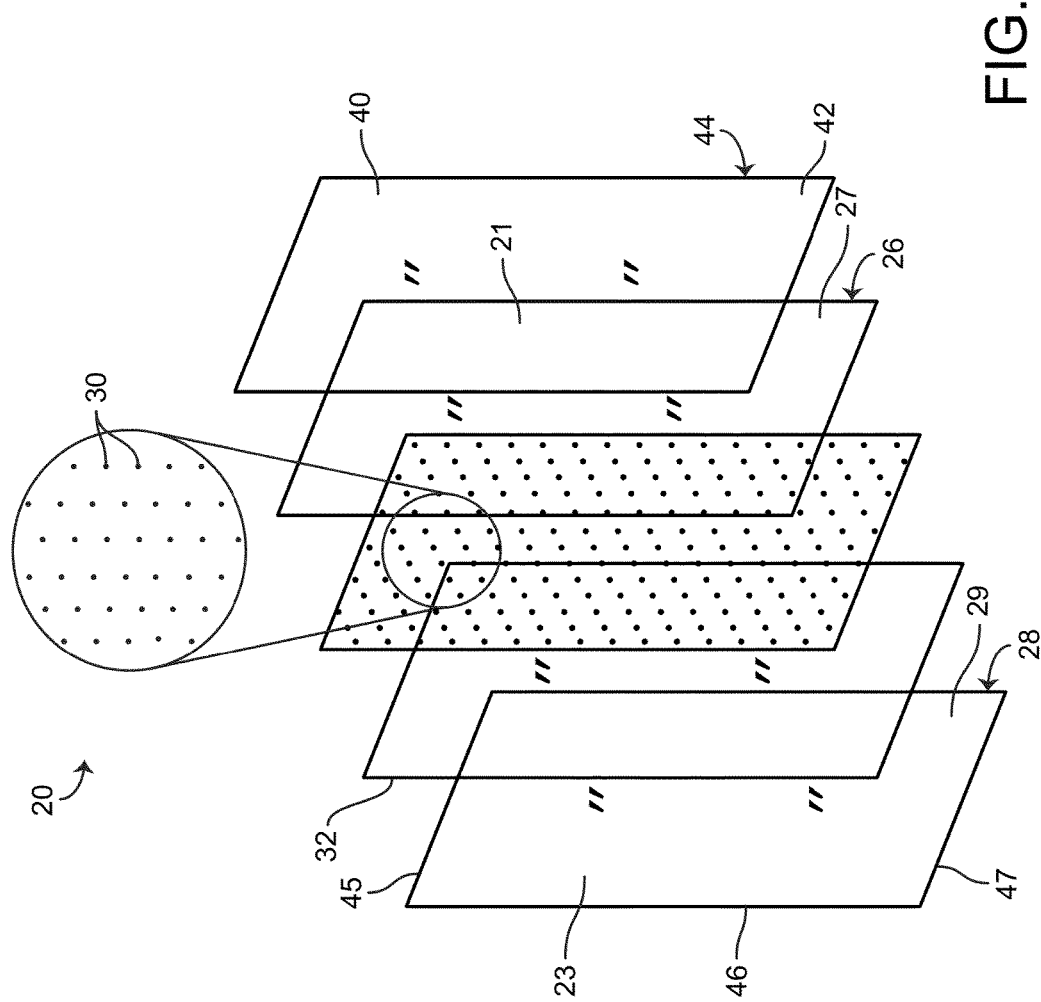
FIG. 7 is an exploded view of the transparent glass unit of FIG. 1, according to an exemplary embodiment.

Referring now to FIG. 7, an exploded view drawing illustrating transparent unit 20 in greater detail is shown, according to an exemplary embodiment. Transparent unit 20 is shown to include a front vacuum pane 21 and a rear vacuum pane 23. Front vacuum pane 21 has an outside surface 26 and an inside surface 27. Outside surface 26 faces toward a consumer standing in front of the display case when door 12 is closed. Inside surface 27 faces toward merchandise within the display case when door 12 is closed. Rear vacuum pane 23 has an inside surface 28 and an outside surface 29. Inside surface 28 faces toward a consumer standing in front of the display case when door 12 is closed. Outside surface 29 faces toward merchandise within the display case when door 12 is closed.

In some embodiments, front vacuum pane 21 and rear vacuum pane 23 are made of non-tempered glass. Advantageously, using non-tempered glass allows vacuum panes 21 and 23 to be flatter (i.e., more planar, less variation in surface direction, etc.) than if vacuum panes 21 and 23 were made of tempered glass. The residual stresses which cause tempered glass to fracture into many small pieces when broken can cause warping or bending in panes of tempered glass. Using non-tempered glass for vacuum panes 21 and 23 reduces or eliminates residual stresses and causes surfaces 26-29 to be significantly flatter than if tempered glass were used. Such a use of non-tempered glass allows vacuum panes 21 and 23 to be separated by a minimal and substantially uniform distance (e.g., less than 1 mm, less than 0.5 mm, approximately 0.2 mm, as small as 0.2 mm, etc.), thereby minimizing the thickness of transparent unit 20. When transparent unit 20 is assembled, inside surfaces 27 and 28 may be separated from each other by the width of gap 25.

Still referring to FIG. 7, transparent unit 20 is shown to include a perimeter seal 32. Perimeter seal 32 may be, for example, solder glass or another sealing material configured to bond panes 21 and 23 along a perimeter thereof and to provide an airtight seal within gap 25. In some embodiments vacuum pane 23 is smaller than vacuum pane 21. For example, the perimeter of vacuum pane 23 may be circumscribed by the perimeter of vacuum pane 21. Perimeter seal 32 may bond with vacuum pane 23 along top surface 45, side surface 46, bottom surface 47, and side surface 48. Perimeter seal 32 may bond with vacuum pane 21 along inside surface 27.

In some embodiments, transparent unit 20 includes spacers 30 positioned between vacuum panes 21 and 23. Spacers 30 may be configured to maintain the separation between panes 21 and 23 when gap 25 is evacuated. Spacers 30 may prevent external pressure (e.g., atmospheric pressure) from causing panes 21 and 23 to flex inward when a vacuum is drawn in gap 25. In some embodiments, spacers 30 include a plurality of support pillars extending between panes 21 and 23 (e.g., between surfaces 27 and 28). The support pillars may be configured to provide internal support (e.g., compression support) for transparent unit 20 to counter the pressure differential between atmospheric pressure outside panes 21 and 23 and the vacuum between panes 21 and 23 (e.g., within gap 25). Spacers 30 may be arranged in a grid (e.g., approximately 20 mm apart) between panes 21 and 23.

Still referring to FIG. 7, transparent unit 20 is shown to include a safety pane 40. Safety pane 40 has an inside surface 42 and an outside surface 44. Inside surface 42 may be laminated, adhered, or otherwise attached to outside surface 26 of front vacuum pane 21. Safety pane 40 may be made of tempered glass, plastic, or another durable material. Safety pane 40 may provide structural integrity (e.g., rigidity, toughness, strength, etc.) for vacuum panes 21 and 23. Safety pane 40 may prevent vacuum panes 21 and 23 from breaking into potentially dangerous shards in the event that transparent unit 20 is damaged. For example, if one or both of vacuum panes 21 and 23 are broken, safety pane 40 may ensure consumer safety by preventing contact with glass shards. In various embodiments, safety pane 40 may be omitted or replaced with a film or coating to accomplish the same effect.

In some embodiments, one or more of surfaces 26-29 have a film or coating applied thereto. For example, one or more of surfaces 26-29 may have an anti-condensate film or coating (e.g., a pyrolitic coating, a mylar coating, etc.) which may be used to prevent condensation from occurring. In one embodiment, the anti-condensate film or coating is applied to surface 29. In some embodiments, the film or coating applied to surface 29 prevents the contamination of merchandise in the temperature-controlled storage device in the event that vacuum panels 21 and/or 23 are damaged (e.g., by containing glass shards). In other embodiments, the anti-condensate coating can be applied to any of surfaces 26-29 or to a surface of another pane or panel of transparent unit 20 (e.g., to surfaces 42 and/or 44 of safety panel 40). The anti-condensate coating can be applied by spraying, adhering, laminating, or otherwise depositing the coating (e.g., using chemical vapor deposition or any other suitable technique).

In some embodiments, the anti-condensate coating is an electrically-conductive coating. To provide electricity to the coating, transparent unit 20 may include parallel bus bars (e.g., top and bottom, left and right side, etc.). The bus bars may be spaced apart from one another and adhered to the electrically-conductive coating. Each bus bar may include a lead assembly or solder tab for adhering wires that are in communication with an electrical source. In this arrangement, electric current may pass through one of the lead assemblies, to a first of the bus bars, across the electrically-conductive coating to the second bus bar, and through the other lead assembly. The electric current may cause heat to be generated across panes 21 and/or 23 (e.g., due to electrical resistance of the coating), which may assist in preventing condensation on panes 21 and/or 23. An exemplary bus bar system is described in greater detail in U.S. Pat. Nos. 6,606,832, and 6,606,833, which are incorporated by reference herein for their descriptions thereof.

In some embodiments, display case door 12 is configured to maximize visible light transmission from inside the case to the customer, thereby improving the ability of customers to view display items. However, it is also desirable to minimize the transmission of non-visible light (i.e., ultraviolet and infrared light) through transparent unit 20 from outside to inside the case in order to improve thermal performance (e.g., by reducing radiation heat transfer) and to protect items therein.

In some embodiments, display case door 12 may be configured to use non-visible wavelengths of light to heat transparent unit 20, thereby reducing or preventing condensation. For example, one or more of panes 21, 23, or 40 may include an ultraviolet (UV) inhibitor. A UV inhibitor may increase the shelf life of products within the temperature-controlled storage device by preventing ultraviolet light from passing through transparent unit 20. The ultraviolet light may be absorbed or reflected by the UV inhibitor and may be used as a source of energy to heat transparent unit 20. As another example, one or more panes of transparent unit 20 may be treated with a low-emissivity heat-reflective coating to improve overall thermal resistance (e.g., by reducing radiation heat transfer) and/or to prevent external condensation.

In some embodiments, an anti-reflective coating may be applied to any of panes 21, 23, or 40. The anti-reflective coating may absorb or transmit infrared light, ultraviolet light, or any combination thereof. In some embodiments, the anti-reflective coating may absorb or transmit some frequencies of visible light in addition to infrared and/or ultraviolet light.

Advantageously, transparent unit 20 is a thermopane unit that appears as a single pane of glass due to the minimal separation (e.g., 0.2 mm) between vacuum panes 21 and 23. The minimal separation is achieved by providing an evacuated gap 25 between vacuum panes 21 and 23, which creates a thermobreak having a high thermal resistance. The thickness of gap 25 can be precisely controlled by using non-tempered glass for vacuum panes 21 and 23 and providing spacers 30 to maintain the separation between panes 21 and 23.

Figure 8A:
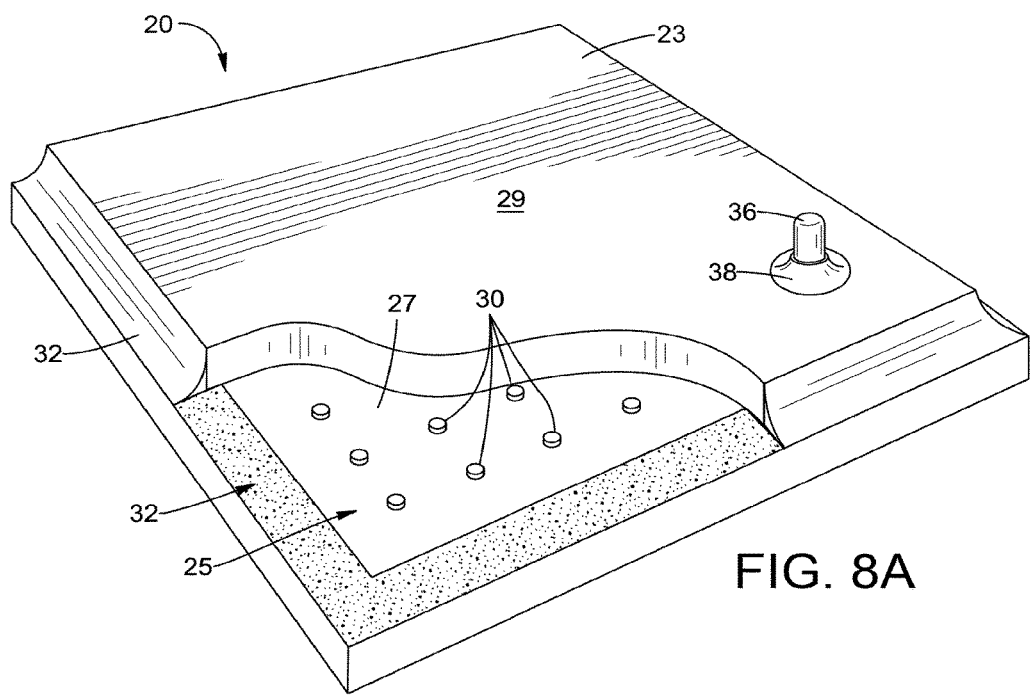
FIG. 8A is a perspective view of the transparent glass unit of FIG. 1, according to an exemplary embodiment.
Figure 8B:
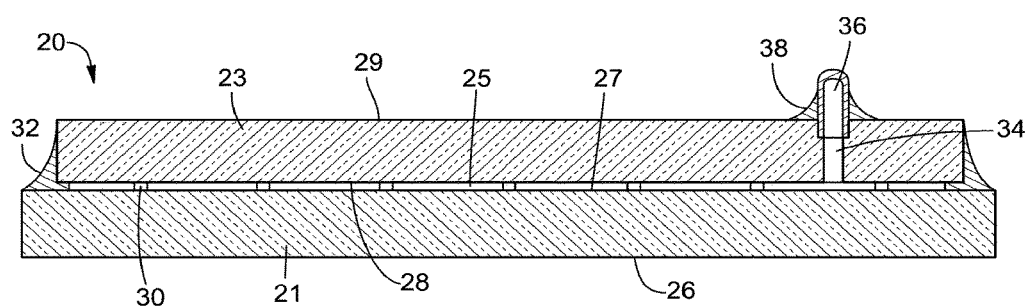
FIG. 8B is a cross-sectional view of the transparent glass unit shown in FIG. 8A, according to an exemplary embodiment.

Referring now to FIGS. 8A and 8B, an assembled version of transparent unit 20 is shown, according to an exemplary embodiment. As shown in FIG. 8B, vacuum panes 21 and 23 are positioned in parallel and offset from each other by the width of gap 25. The width of gap 25 (e.g., the distance between panes 21 and 23) may be uniform or substantially uniform at various locations between vacuum panes 21 and 23 due to the flatness of vacuum panes 21 and 23. Advantageously, using non-tempered glass for vacuum panes 21 and 23 may allow vacuum panes 21 and 23 to be flatter than if tempered glass were used, thereby providing a precise and uniform gap 25 between vacuum panes 21 and 23.

Still referring to FIG. 8B, a plurality of spacers 30 are shown positioned within gap 25. Spacers 30 may be configured to maintain the separation between vacuum panes 21 and 23 when gap 25 is evacuated. Spacers 30 may prevent external pressure (e.g., atmospheric pressure) from causing vacuum panes 21 and 23 to flex inward when a vacuum is drawn in gap 25. In some embodiments, spacers 30 include a plurality of support pillars extending between vacuum panes 21 and 23 (e.g., between surfaces 27 and 28). The support pillars may be configured to provide internal support (e.g., compression support) for transparent unit 20 to counter the pressure differential between atmospheric pressure outside vacuum panes 21 and 23 and the vacuum between panes 21 and 23 (e.g., in gap 25).

As shown in FIG. 8A, spacers 30 may be arranged in a grid (e.g., approximately 20 mm apart) between panes 21 and 23. In some embodiments, spacers 30 are separated from each other by a distance approximately ten times the thickness of gap 25. In some embodiments, each of spacers 30 has a thickness equivalent to the thickness of gap 25 (e.g., approximately 0.2 mm). Spacers 30 may contact surfaces 27 and 28 to ensure that the thickness of gap 25 is maintained. In some embodiments, spacers 30 are cylindrical or substantially cylindrical. Spacers 30 may have a diameter or width of approximately 0.5 mm. Spacers 30 may be transparent or semi-transparent to minimize the visibility thereof.

Still referring to FIGS. 8A and 8B, gap 25 may be sealed around a perimeter of vacuum panes 21 and 23 by perimeter seal 32. Perimeter seal 32 may be, for example, solder glass or another sealing material configured to bond vacuum panes 21 and 23 along a perimeter thereof and to provide an airtight seal within gap 25. Gap 25 may be accessed via a channel 34 extending through one of vacuum panes 21 or 23. For example, as shown in FIG. 8A, channel 34 passes through rear vacuum pane 23 between surfaces 28 and 29. In other embodiments, channel 34 may pass through front vacuum pane 21 or through perimeter seal 32. Channel 34 may be used to remove air from gap 25 (e.g., after perimeter seal 32 is applied) to draw a vacuum in gap 25.

Channel 34 may be capped (e.g., closed, sealed, blocked, etc.) by an end cap 36. End cap 36 may be fastened (e.g., attached, bonded, fixed, etc.) within channel 34 to maintain the vacuum in gap 25. End cap 36 may be sealed to vacuum pane 21 or to vacuum pane 23 by a cap seal 38. Cap seal 38 may be the same or similar to perimeter seal 32. For example, cap seal 38 may be solder glass or another sealing material configured to bond end cap 36 to one or both of vacuum panes 21 and 23 (e.g., bonding to surface 29 or to surface 26).

Figure 9:
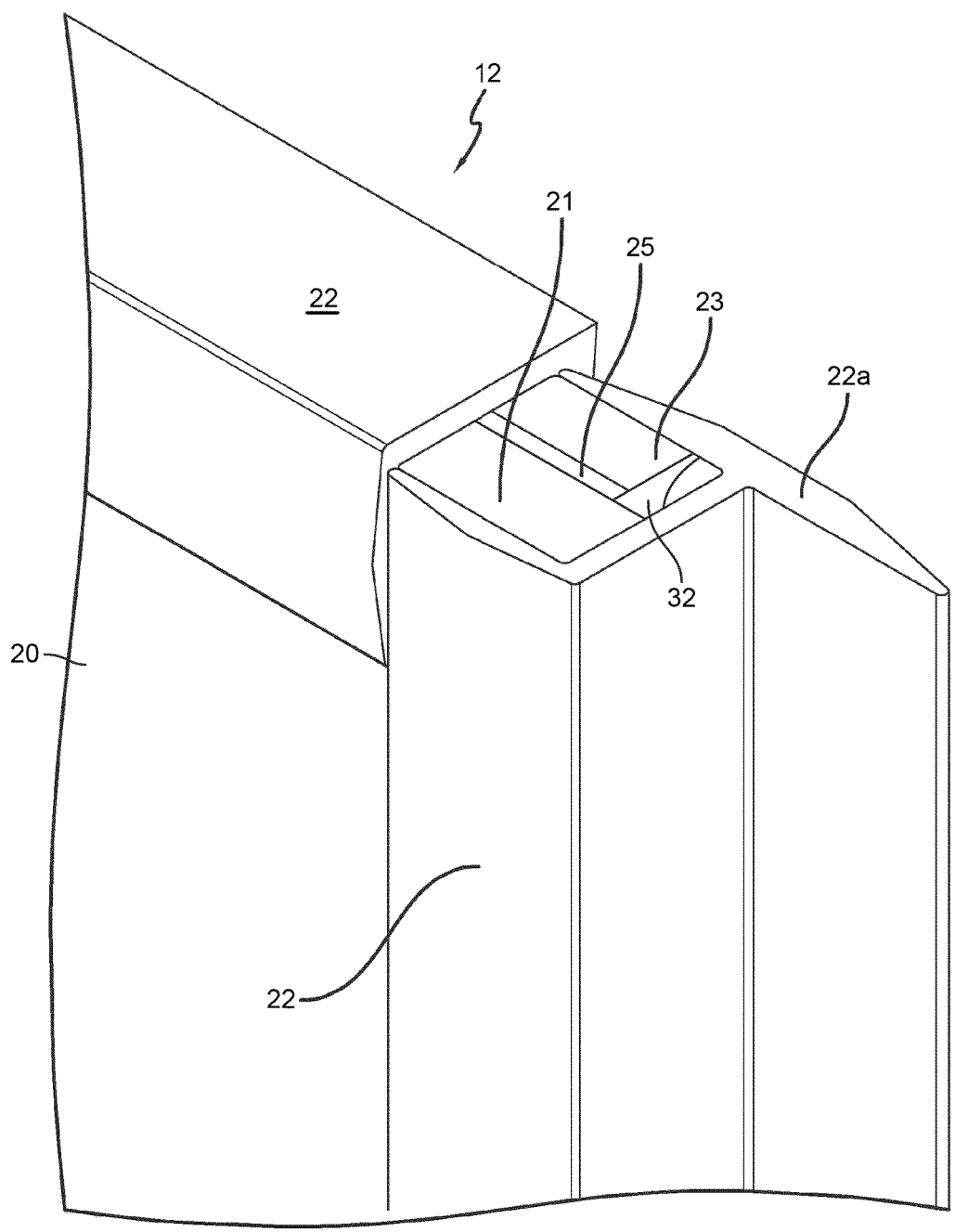
FIG. 9 is a perspective view of the transparent glass unit with edge guards thereon, according to an exemplary embodiment.

Referring now to FIG. 9, transparent unit 20 is shown with edge guards 22, according to an exemplary embodiment. Edge guards 22 may by open channels (e.g., U-shaped or C-shaped channels) configured to fit over an edge of transparent unit 20. Edge guards 22 may be adhered to the top edge, bottom edge, and non-hinge side edge of transparent unit 20. For example, silicon or the like could be used for bonding. In some embodiments, edge guards 22 may be made of a transparent or semi-transparent material to maximize visibility through display case door 12.

Edge guards 22 may provide a sealing feature and may ensure that a person cannot come into contact with any electrically charged surfaces. Preferably, the edge guard 22 on the non-hinged side edge of transparent unit 20 (e.g., on the right in FIG. 9) includes a wiper 22a that cooperates with a corresponding wiper 22a on an opposite oriented door (as shown in FIG. 5) to seal the temperature-controlled storage device when doors 12 are closed. In another embodiment, edge guards 22 may be omitted.

Figure 10:
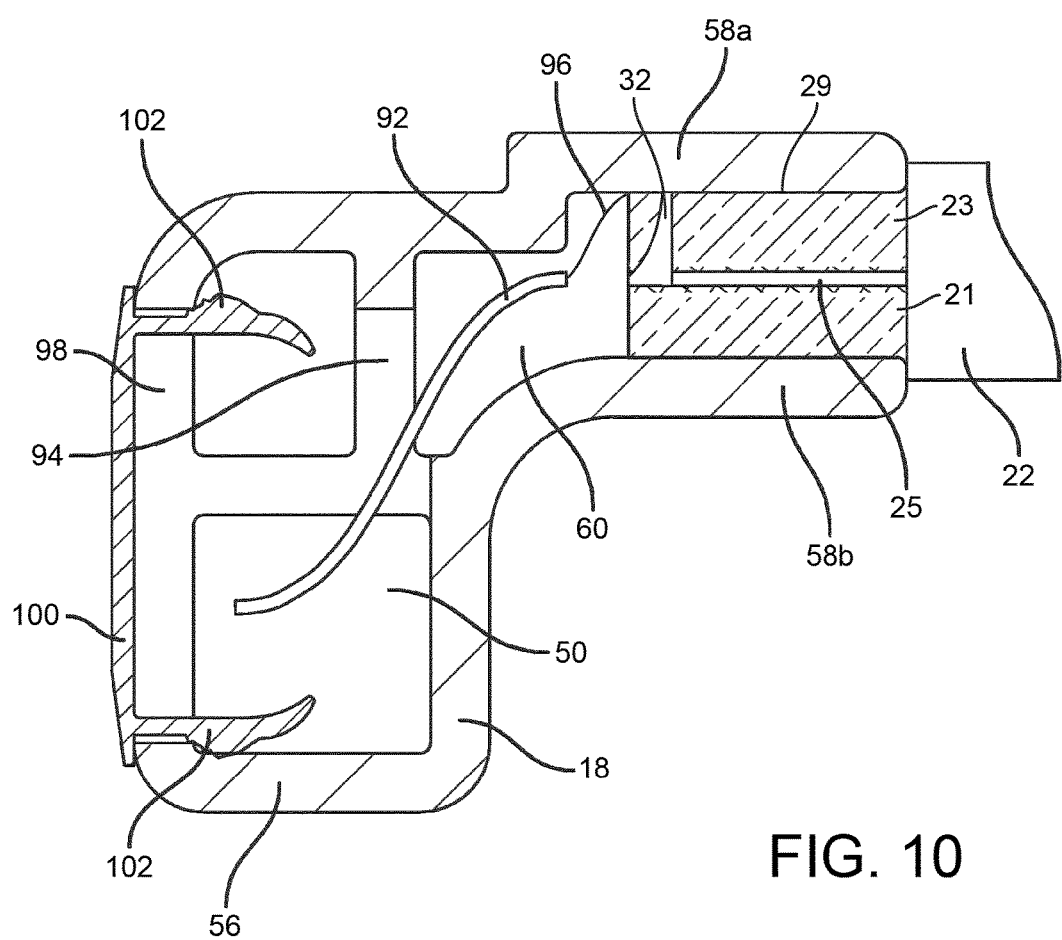
FIG. 10 is a cross-sectional plan view of the rail of the assembly of FIG. 1, according to an exemplary embodiment.
Figure 11:
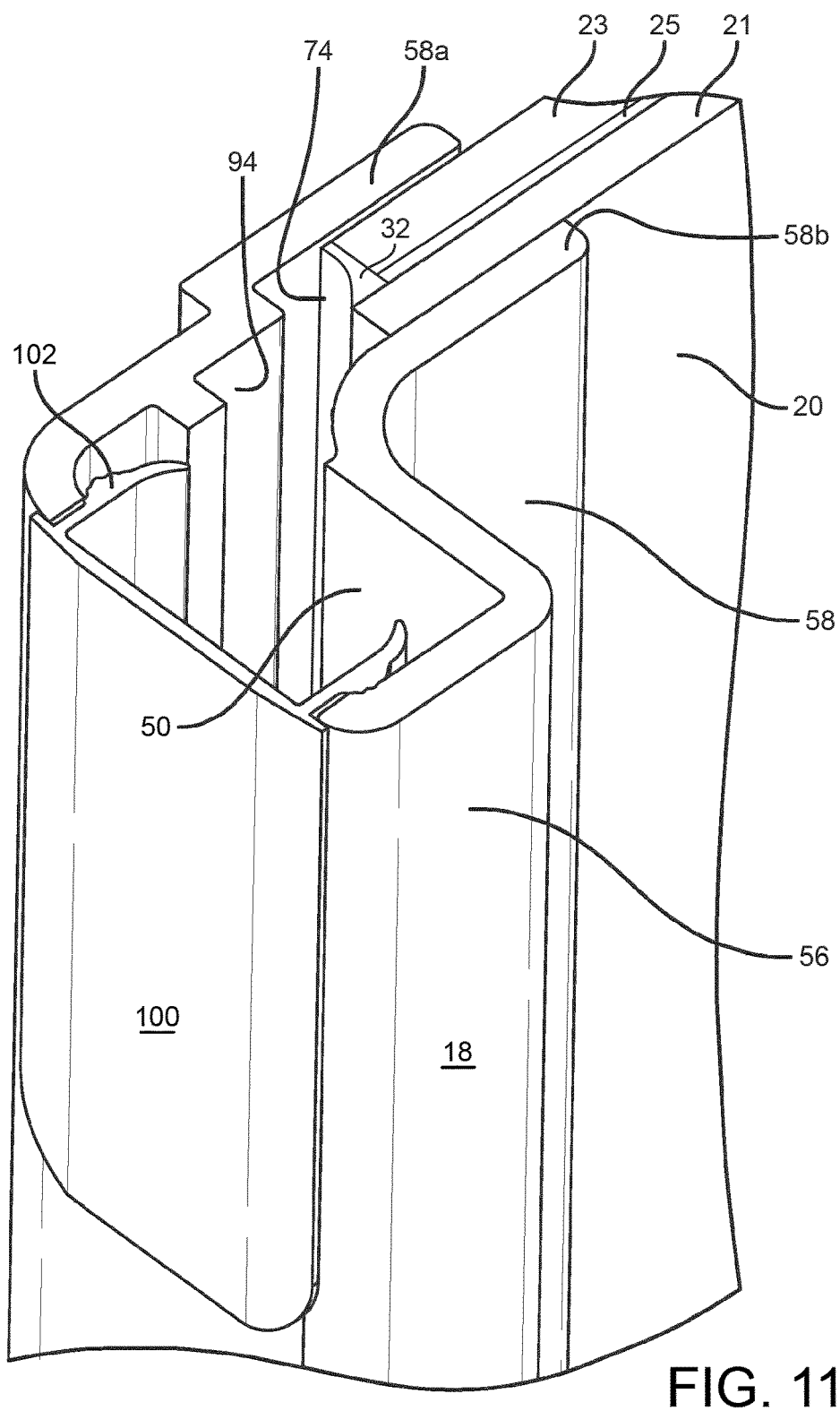
FIG. 11 is a cross-sectional perspective view of the rail of the assembly of FIG. 1, according to an exemplary embodiment.
Figure 12:
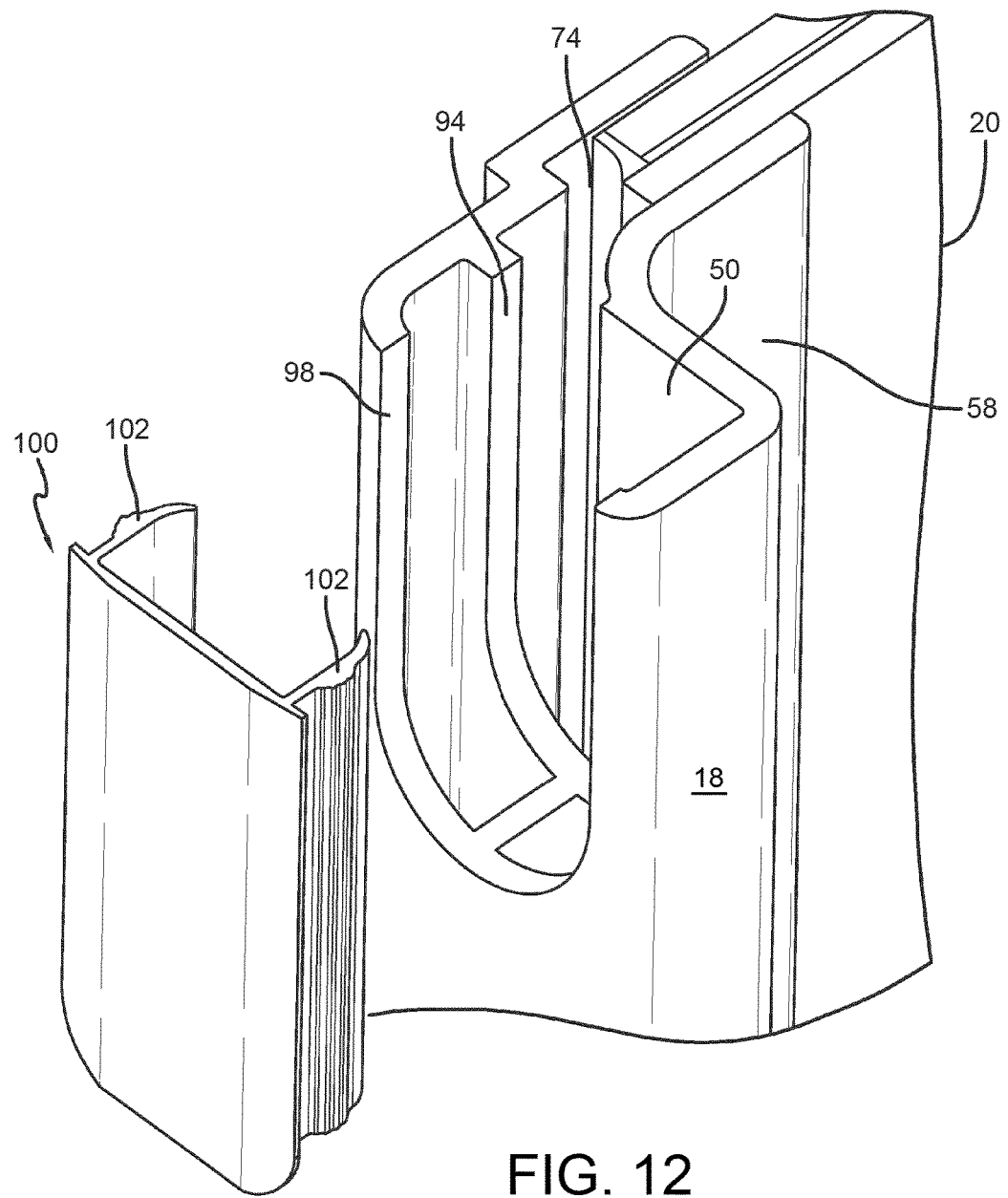
FIG. 12 a is a cross sectional perspective view of the rail of the assembly of FIG. 1 with an access cover removed from an access opening, according to an exemplary embodiment.

Referring now to FIGS. 10-12, transparent unit 20 is shown secured in rail 18, according to an exemplary embodiment. Rail 18 may attach to transparent unit 20 along the vertical length of transparent unit 20. Rail 18 is shown to include a channel 50 having openings at the top and bottom thereof. The openings into channel 50 may be configured to receive hinge pins for hingedly connecting door 12 to frame 14. In a preferred embodiment, display case door assembly 10 includes a gravity hinge 52 at the bottom of channel 50 and an electrical hinge 54 at the top of channel 50 (described in greater detail with reference to FIGS. 13-16). In other embodiments, electrical hinge 54 may be omitted or replaced with a non-electrical hinge.

As shown in FIG. 10, rail 18 may have an "L" shaped cross-section when viewed from the top or the bottom. The "L" shape is shown to include a hinge portion 56 and a transparent unit receiving portion 58. Transparent unit receiving portion 58 may include opposing members 58a and 58b that define a channel 74 for receiving and securing transparent unit 20. In some embodiments, rail 18 is an aluminum extrusion into which transparent unit 20 is bonded (e.g., using an adhesive such as epoxy or polyurethane). A tape that incorporates an adhesive, such as acrylic or the like may also be used. In other embodiments, a mechanical clamp could be used to secure transparent unit 20 place. Combinations of a clamp and adhesives or tape could also be used. None of these are a limitation on the present invention. In other embodiments, rail 18 can be made of another material, such as stainless steel or other metal.

Referring now to FIGS. 13-16, those skilled in the art will appreciate the advantages of a gravity hinge, which generally includes a lower portion and an upper portion that rotates about an oblique junction upon the application of a rotational force. As the upper portion rotates, the two portions separate due to the oblique junction. The upper portion "rises" thereby storing potential energy which will cause the upper portion to "fall" or rotate back to a neutral position when the rotational force is terminated. Examples of gravity hinges are shown in U.S. Pat. No. 4,631,777 to Takimoto, U.S. Pat. No. 3,733,650 to Douglas and U.S. Pat. No. 4,991,259 to Finkelstein et al, the entireties of which are incorporated herein by reference.

The gravity hinge 52 of the preferred embodiment includes a lower portion 60 and an upper 62. The lower portion 60 includes a plate 64 having an axial rod 66 extending upwardly therefrom. The upper portion 62 includes a collar 68 and a hinge pin 70 that are axially aligned and cooperate to define an opening 72 for receiving axial rod 66 of lower portion 60. Lower and upper portions 60 and 62 each include a cam track thereon (e.g., cam tracks 60a and 62a, respectively) that cooperate as described below. To secure door 12 on gravity hinge 52, hinge pin 70 is received in an opening at the bottom of channel 50 and rail 18 rests on collar 68.

In a preferred embodiment, the gravity hinge 52 includes a hold open feature. As shown in FIG. 14, cam track 62a on the upper portion 62 includes two peaks 76 and 78, one corresponding to the door closed position 76 and the other corresponding to the door open position 78. These peaks or detents are sized to receive the lower portion's cam track 62a. FIG. 17, shows gravity hinge 52 in the closed position. Preferably, closed peak 76 extends vertically higher than open peak 78. With this arrangement, when a user pushes door 12 from the open position toward the closed position, as a result of gravity and the potential energy stored when the door is in the open position, the door will fall to the closed position. FIG. 17 shows gravity hinge 52 just as the upper portion 62 is about to fall to the closed position. As shown in FIGS. 13-16, peaks 76 and 78 are preferably located about 90° apart, which allows door 12 to be held open at a position about perpendicular to the closed position. However, open detent 78 can be defined at other angles about the collar 68, as desired.

Figure 16:
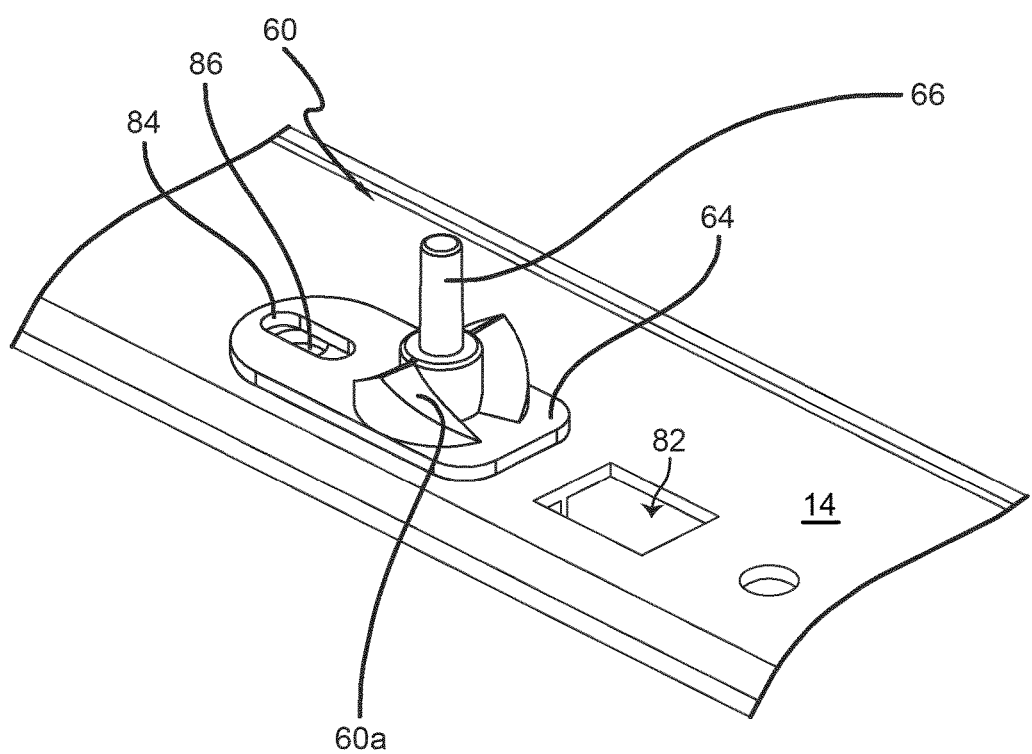
FIG. 16 is a perspective view of a lower portion of the gravity hinge of FIG. 14 mounted in the door frame of FIG. 1, according to an exemplary embodiment.
Figure 17:
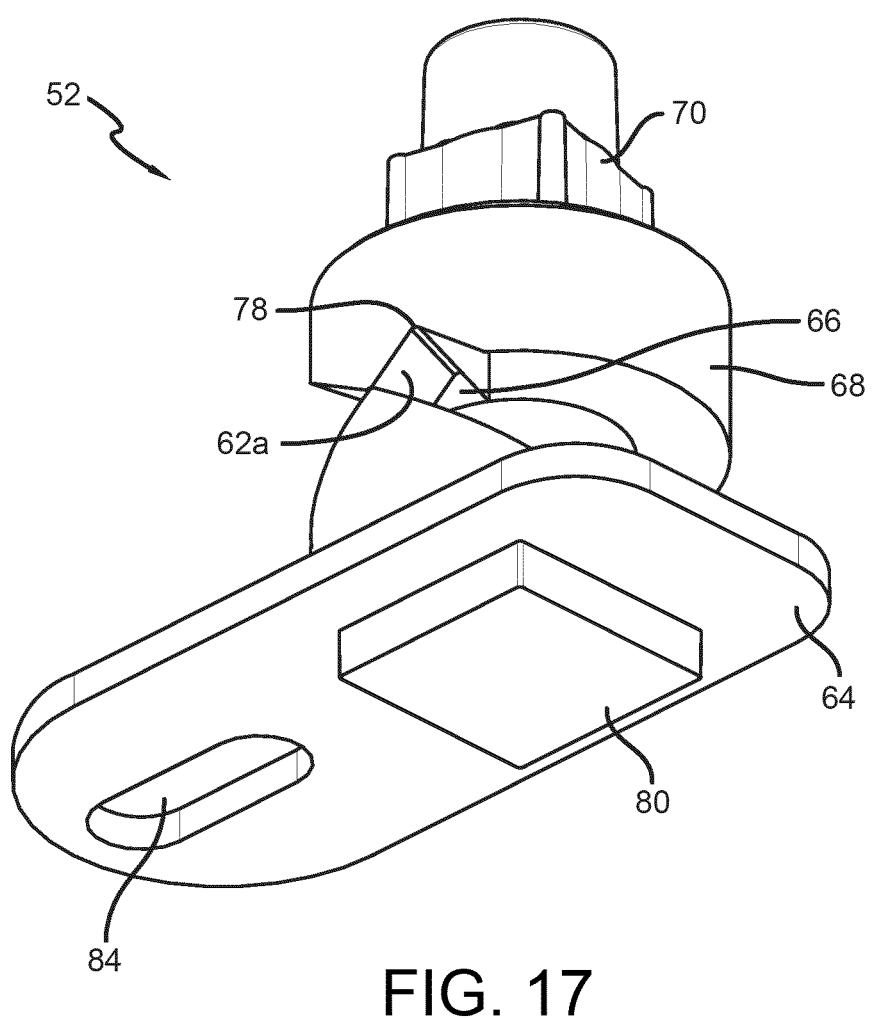
FIG. 17 is a bottom perspective view of the gravity hinge of FIG. 14 showing an upper portion of the gravity hinge in an open position, according to an exemplary embodiment.

Referring now to FIGS. 16-17, plate 66 is shown to include an alignment member 80 extending downwardly that is received into an alignment opening 82 in frame 14. Plate 64 also has an elongated slot 84 defined therein. To secure gravity hinge 52 to frame 14, a threaded fastener, such as a riv nut or clinch nut (not shown) extends through slot 84 and is threaded into an opening 86 in frame 14. Elongated slot 84 allows gravity hinge 52 a degree of adjustability. This helps prevent door sag and helps keep door 12 square or plumb as desired. It will be understood that gravity hinge 52 can be secured to frame 14 by other methods, such as welding, adhering, a threaded fastener with a nut, riveting, etc. In a preferred embodiment, upper portion 62 is comprised of a molded nylon and lower portion 60 is comprised of a metal, such as die cast zinc, stainless steel or the like.

Figure 13:
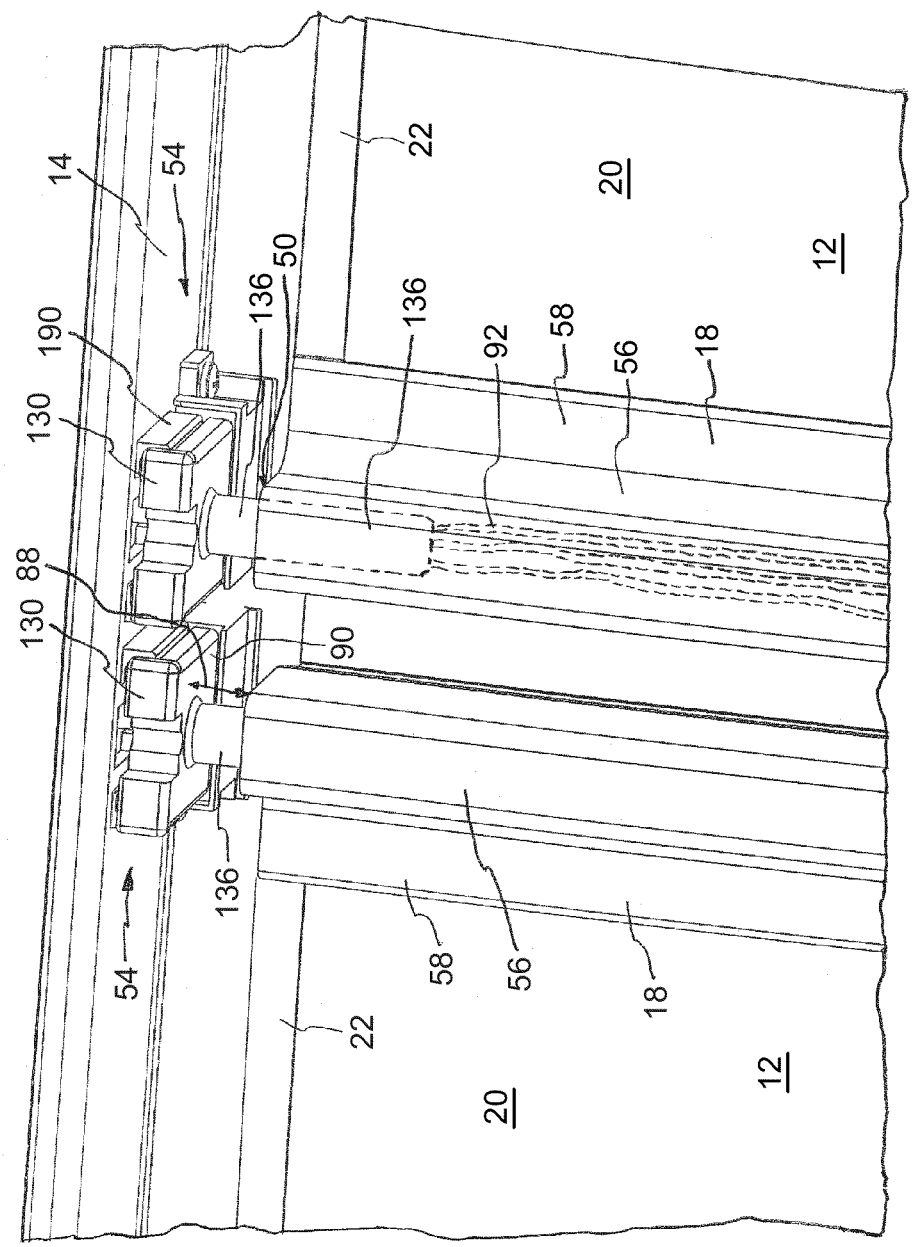
FIG. 13 is a partial interior perspective view of the assembly of FIG. 1, showing electrical hinge pins and doors, according to an exemplary embodiment.
Figure 14:
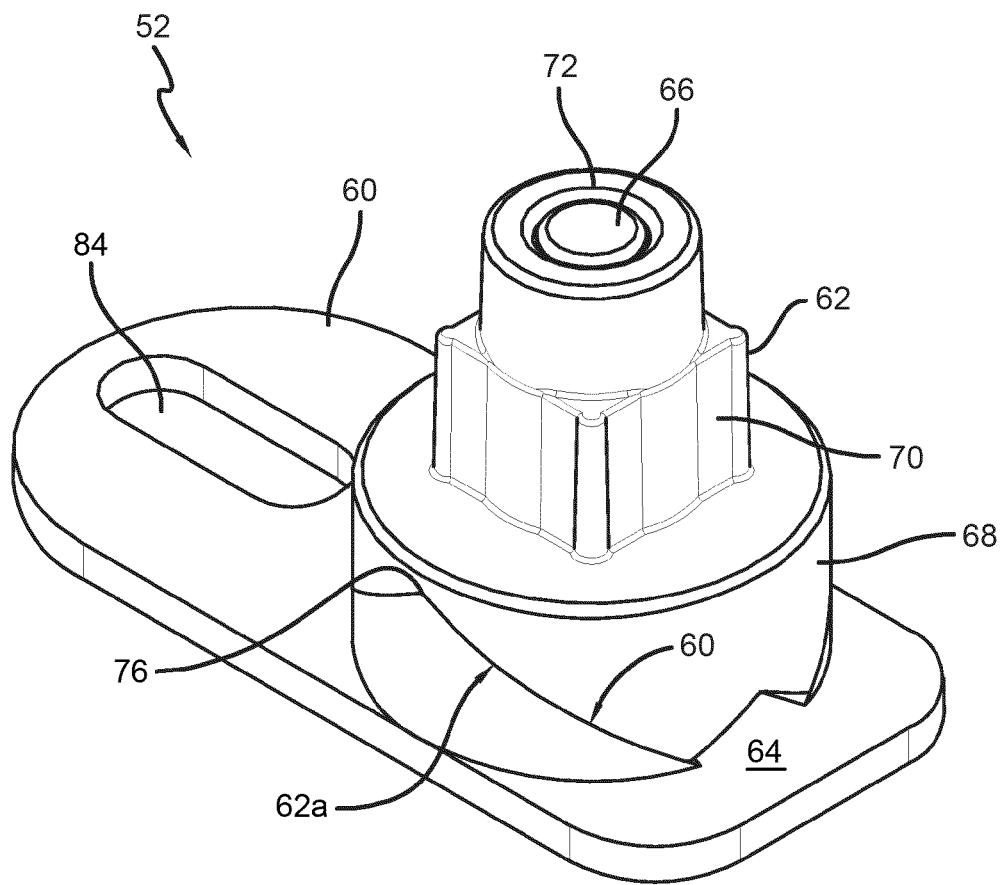
FIG. 14 is a perspective view of a gravity hinge for use with the display case door assembly of FIG. 1, according to an exemplary embodiment.
Figure 15:
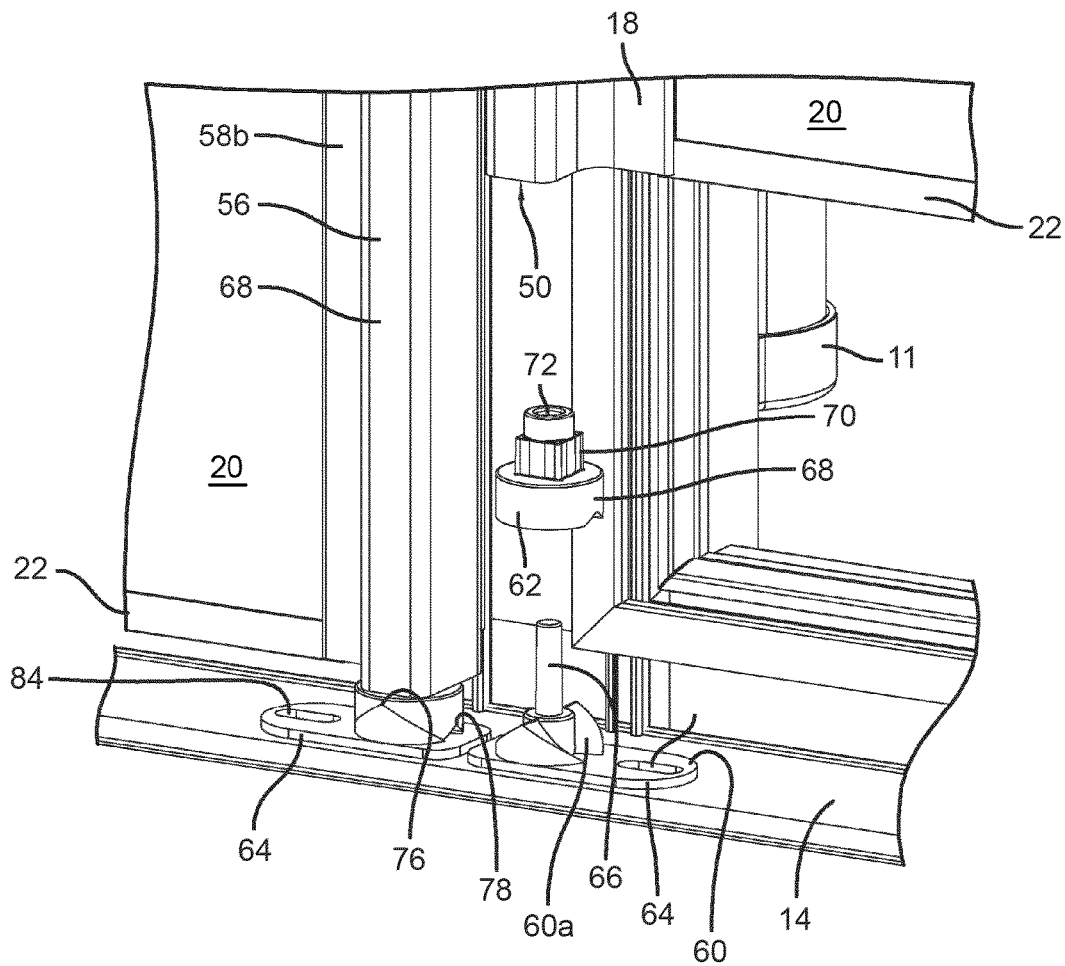
FIG. 15 is a partial interior perspective view of the assembly of FIG. 1 showing the gravity hinge of FIG. 14 exploded from the door and rail, according to an exemplary embodiment.
Figure 18:
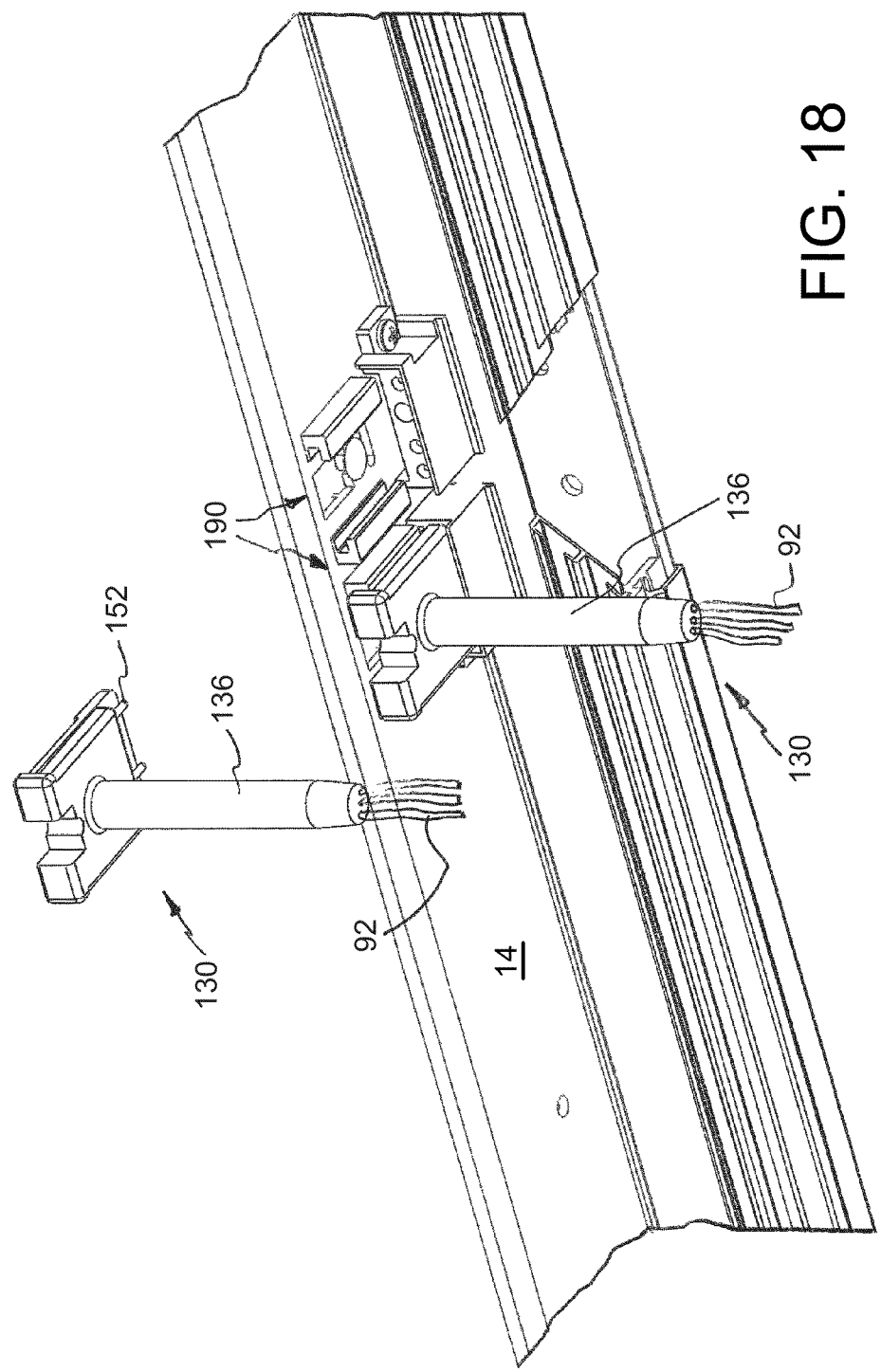
FIG. 18 is a perspective view drawing of two electrical hinge pins for use with the display case door assembly of FIG. 1, showing one of the hinge pins exploded away from a female connector, according to an exemplary embodiment.

With reference to FIGS. 13 and 18, as discussed above, the assembly preferably includes an electrical or plug in hinge pin 54 at the top thereof. For example, electrical hinge pin 54 can be that taught in U.S. Pat. No. 4,671,582 (referred to herein as the "'582 patent"), titled combined plug-in hinge pin and double ended electrical connector for a hinged appliance door, with mating receptacle and connectors, issued Jun. 9, 1987, the entirety of which is incorporated herein by reference. As shown in FIG. 18, the components identified as the combined plug-in hinge pin and double-ended electrical plug assembly 130, hinge pin part 136, male contact pin members 152, and female connector assembly 190 are numbered items 30, 36, 52, and 90 of the '582 patent.

In a preferred embodiment, there is a gap 88 between the top of rail 18. As shown in FIG. 13, gap 88 is more specifically between rail 18 and reinforcing member 90 (part of the male connection portion of electrical hinge pin 54). Gap 88 allows door 12 to travel up and down as a result of the cam action of gravity hinge 52.

As shown in FIG. 13, electrical hinge pin 54 includes a hinge pin part 136 that extends downwardly into the top opening of tunnel 50. Therefore, hinge pin part 136 and hinge pin 70 are coaxial (as a result of both extending into tunnel 50) and allow door 12 to pivot. Hinge pin part 136 houses insulated conductors 92 that extend out of the bottom of hinge pin part 136 and into tunnel 50. As shown in FIG. 10, which is a cross section of door 12, rail 18 includes a conductor opening 94 defined therein that provides communication between tunnel 50 and channel 74. For implementations in which transparent unit 20 is powered, power can run from a wall outlet or the like, through wiring hidden in frame 14, through electrical hinge pin 54 down wires 92 extending down tunnel 51, through the conductor opening 94, into channel 74 and to solder tabs 96. Solder tabs 96 may connect with bus bars to provide power to an electro-conductive coating (e.g., on surface 29). In this arrangement, all the wires necessary to provide power to the electro-conductive coating (if any) can be hidden from view of a consumer.

In a preferred embodiment, rail 18 also includes wire access opening 98 that opens to the outside of rail 18. In this embodiment, wires 92 from electrical hinge pin 54 pass down tunnel 50 to opening 98, and wires 92 from the bus pass down channel 74, through opening 94 to opening 98 where, during assembly, electrical connections between the wires can be made externally. Once electrical hinge pin 54 and transparent unit 20 lead connections are made, wires 92 are placed back into rail 18 and an access cover 100 is inserted in the wire access hole 98 to conceal the connections. Access cover 100 is preferably made of plastic or the like and includes tabs 102 that secure it within the opening 98 via a snap fit.

Figure 19:
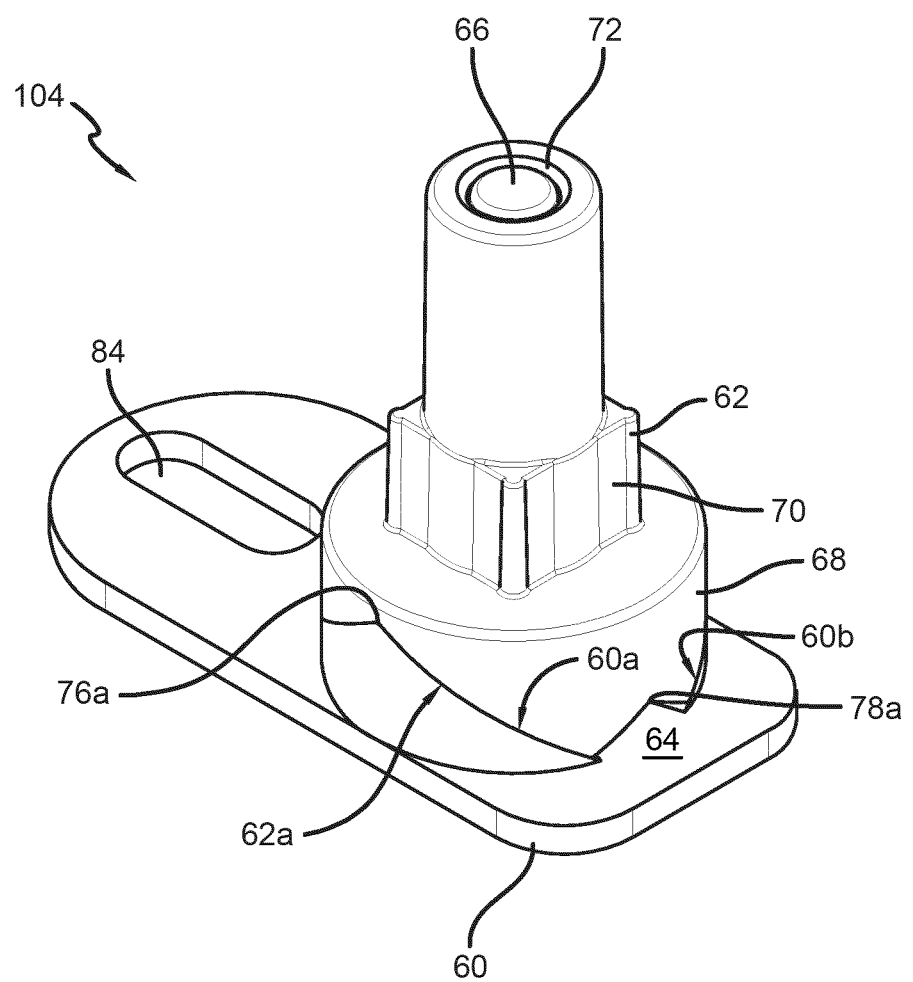
FIG. 19 is a perspective view of another gravity hinge for use with the display case door assembly of FIG. 1, according to another exemplary embodiment.
Figure 20:
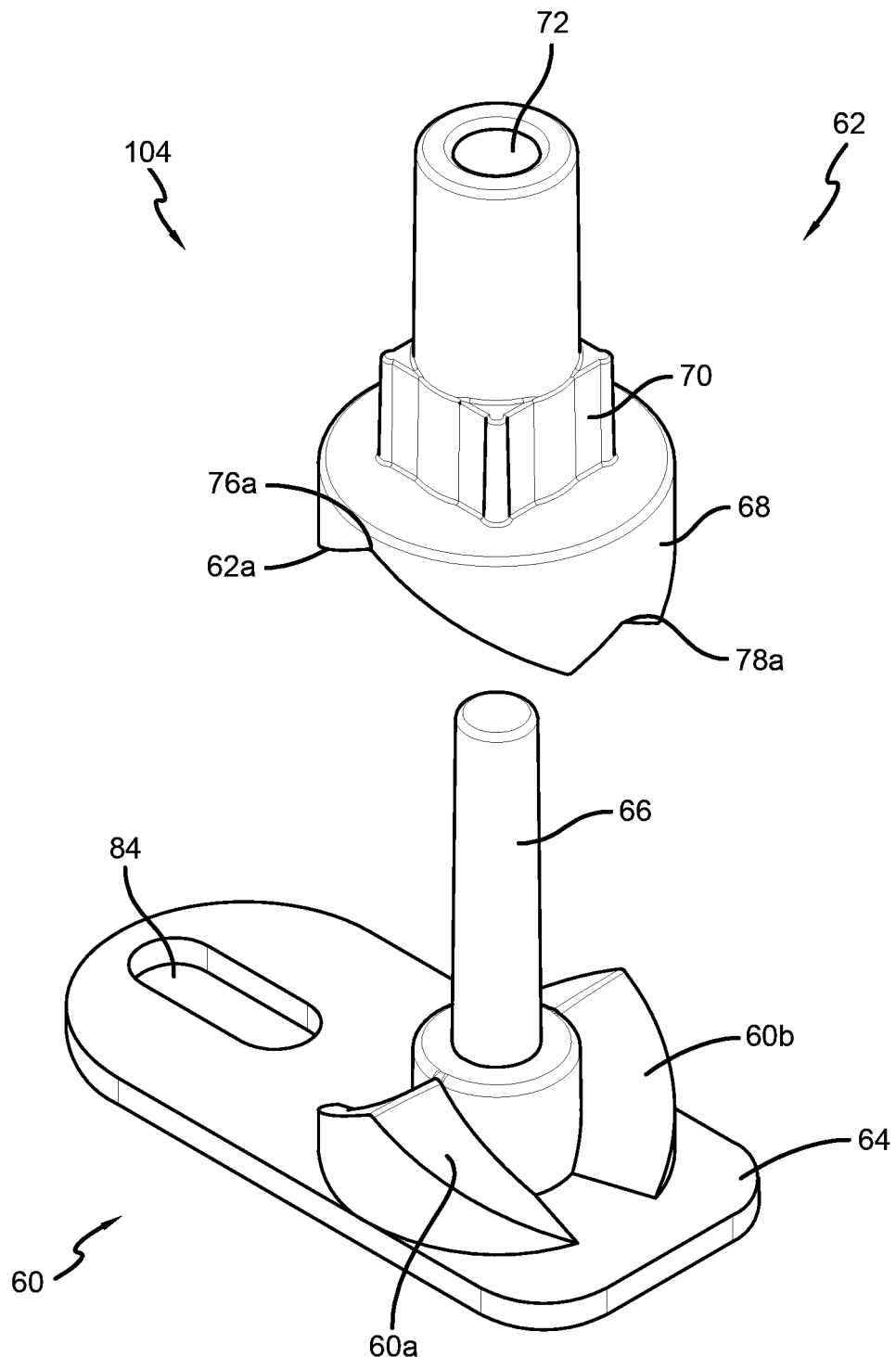
FIG. 20 is a top exploded perspective view of the gravity hinge of FIG. 19, according to an exemplary embodiment.
Figure 21:
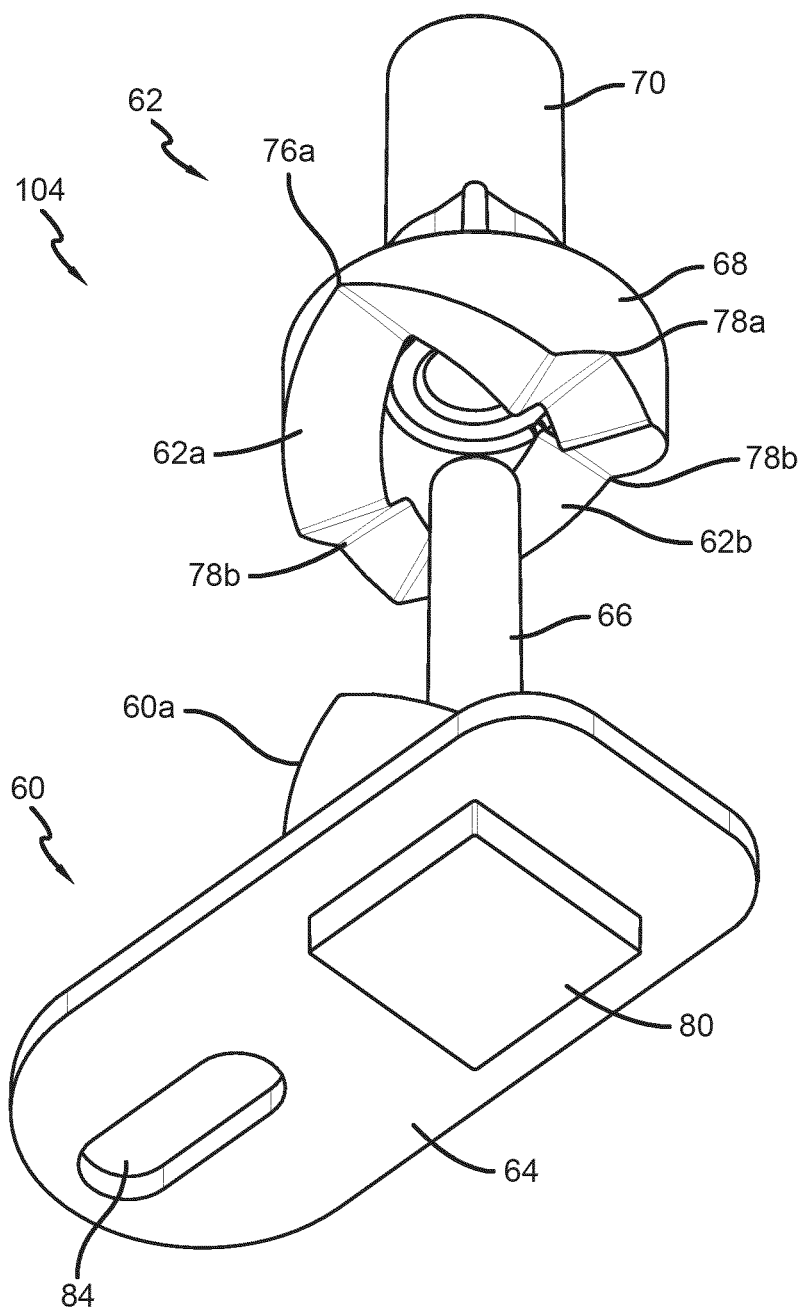
FIG. 21 is a bottom exploded perspective view of the gravity hinge of FIG. 19, according to an exemplary embodiment.

With reference to FIGS. 19-21, another embodiment of a gravity hinge 104 is shown. This gravity hinge 104 is similar to the gravity hinge 52 described above, except that the lower and upper portions 60 and 62 each include dual or first and second cam tracks 60a, 60b and 62a thereon. As shown in FIG. 21, cam tracks 62a and 62b on upper portion 62 each comprise two peaks 76a, 76b and 78a, 78b, two corresponding to the door closed position 76a, 76b and the others corresponding to the door open position 78a, 78b. These peaks or detents are sized to receive the lower portion's cam tracks 62a and 62b. FIG. 19, shows gravity hinge 104 in the closed position. Preferably, closed peaks 76a and 76b extend vertically higher than open peaks 78a and 78b. With this arrangement, when a user pushes the door from the open position toward the closed position, as a result of gravity and the potential energy stored when the door is in the open position, the door will fall to the closed position. As shown in FIGS. 19-21, in a preferred embodiment, closed peaks 76a and 76b are about 180° apart. Also, open peaks 78a and 78b are about 180° apart. This helps distribute the weight or load of the door and helps prevent door sag, damage, wear and tear, etc.

It will be understood by those skilled in the art that all of the components of display case door assembly 10, including door 12 (e.g., transparent unit 20, rail 18, etc.), gravity hinges 52 or 104 and electrical hinge pin 54, among others, are all reversible and can be used on left hinge and right hinge doors. For example, see FIG. 15, which shows the same configuration gravity hinge 52 for left hinge and right hinge doors. In another embodiment, the components of the upper and lower portions 60, 62 of the gravity hinges can be reversed such that the concave portions of the cam track are on the lower portion, the convex portions of the cam track are on the upper portion and the axial rod extends from the upper portion, etc.

The construction and arrangement of the systems and methods as shown in the various exemplary embodiments are illustrative only. Although only a few implementations of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited.

Numerous specific details are described to provide a thorough understanding of the disclosure. However, in certain instances, well-known or conventional details are not described in order to avoid obscuring the description. References to "some embodiments," "one embodiment," "an exemplary embodiment," and/or "various embodiments" in the present disclosure can be, but not necessarily are, references to the same embodiment and such references mean at least one of the embodiments.

Alternative language and synonyms may be used for anyone or more of the terms discussed herein. No special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

The elements and assemblies may be constructed from any of a wide variety of materials that provide sufficient strength or durability, in any of a wide variety of colors, textures, and combinations. Further, elements shown as integrally formed may be constructed of multiple parts or elements.

As used herein, the word "exemplary" is used to mean serving as an example, instance or illustration. Any implementation or design described herein as "exemplary" is not necessarily to be construed as preferred or advantageous over other implementations or designs. Rather, use of the word exemplary is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary implementations without departing from the scope of the appended claims.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

As used herein, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A vacuum-insulated refrigerated display case door, comprising:
   a hinge rail comprising a channel portion and a hinge receiving portion, the hinge receiving portion defining two openings configured to receive hinge pins for mounting the door to a refrigerated case;
   a vacuum-insulated glass (VIG) panel assembly having a front surface arranged to face away from a refrigerated display case with the door mounted, and a rear surface arranged to face into the refrigerated display case with the door mounted, the VIG panel assembly comprising two panes of glass bounding a sealed evacuated space between the panes; and
   an additional pane of tempered glass laminated to one of the two panes, one of the two panes of glass comprising a low emissivity layer, wherein a first edge of the VIG panel assembly is disposed within the channel portion of the hinge rail and the VIG panel assembly is arranged such that the additional pane of glass is at the front surface of the VIG panel assembly;
   a handle secured to a front surface of the VIG panel assembly without penetrating the additional pane of glass, the handle arranged to extend away from the refrigerated display case with the door mounted;
   edge guards coupled to each of a second edge, a third edge, and a fourth edge of the VIG panel assembly, wherein one of the edge guards comprises a wiper configured to seal the door when the door is in a closed position; and
   an anti-condensate coating at the rear surface of the VIG panel assembly.

2. The door of claim 1, wherein an adhesive is disposed between the first edge of the VIG panel and the channel portion of the rail.

3. The door of claim 1, wherein the handle has an arched shape.

4. The door of claim 1, wherein the handle comprises aluminum.

5. The door of claim 1, wherein the rail comprises extruded aluminum.

6. The door of claim 1, wherein the edge guards are substantially transparent.

7. The door of claim 1, wherein the edge guards are bonded to the respective ones of the first, second, and third edges of the VIG panel assembly.

8. The door of claim 1, wherein the VIG panel assembly comprises a plurality of spacers disposed between the panes.

9. The door of claim 1, wherein the handle is secured to the VIG panel assembly by an adhesive bond.

10. A refrigerated display case comprising:
    a frame; and
    a first vacuum-insulated door and a second vacuum-insulated door mounted to the frame, each of the first vacuum-insulated door and the second vacuum-insulated door comprising:
    a hinge rail comprising a channel portion and a hinge receiving portion, the hinge receiving portion defining two openings configured to receive hinge pins for mounting the door to a refrigerated case;
    a vacuum-insulated glass (VIG) panel assembly having a front surface arranged to face away from a refrigerated display case with the door mounted, and a rear surface arranged to face into the refrigerated display case with the door mounted, the VIG panel assembly comprising two panes of glass bounding a sealed evacuated space between the panes; and an additional pane of tempered glass laminated to one of the two panes, one of the two panes of glass comprising a low emissivity layer, wherein a first edge of the VIG panel assembly is disposed within the channel portion of the hinge rail and the VIG panel assembly is arranged such that the additional pane of glass is at the front surface of the VIG panel assembly;

a handle secured to a front surface of the VIG panel assembly without penetrating the additional pane of glass, the handle arranged to extend away from the refrigerated display case with the door mounted;

edge guards coupled to each of a second edge, a third edge, and a fourth edge of the VIG panel assembly, wherein one of the edge guards comprises a wiper configured to seal the door when the door is in a closed position; and an anti-condensate coating at the rear surface of the VIG panel assembly.

11. The refrigerated display case of claim 10, wherein the wiper of the first vacuum-insulated door cooperates with the wiper of the second vacuum-insulated door to seal the display case when both the first vacuum-insulated door and the second vacuum-insulated door are in the closed position.

12. The display case of claim 10, wherein an adhesive is disposed between the first edge of the VIG panel and the channel portion of the rail.

13. The display case of claim 10, wherein the handle has an arched shape.

14. The display case of claim 10, wherein the handle comprises aluminum.

15. The display case of claim 10, wherein the rail comprises extruded aluminum.

16. The display case of claim 10, wherein the edge guards are substantially transparent.

17. The display case of claim 10, wherein the edge guards are bonded to the respective ones of the first, second, and third edges of the VIG panel assembly.

18. The display case of claim 10, wherein the VIG panel assembly comprises a plurality of spacers disposed between the panes.

19. The display case of claim 10, wherein the handle is secured to the VIG panel assembly by an adhesive bond.

20. The door of claim 1, wherein the VIG panel assembly comprises a vacuum port passing through the rear surface of the VIG panel assembly, and wherein the VIG panel assembly is arranged in the hinge rail such that the vacuum port faces into the refrigerated display case with the door mounted when the door is in a closed position.

21. The door of claim 20, wherein the VIG panel assembly is arranged in the hinge rail such that the vacuum port is positioned adjacent a corner formed between the first edge and the second edge, the second edge forming a top edge of the door.

* * * * *